US007953904B2

(12) United States Patent
Hemmi et al.

(10) Patent No.: US 7,953,904 B2
(45) Date of Patent: May 31, 2011

(54) STORAGE CONTROL APPARATUS HAVING POWER SAVING CONTROLLER WHICH STOPS PARTICULAR DATA TRANSFERS BASED ON CONNECTION AND DATA TRANSFER RATES

(75) Inventors: Masateru Hemmi, Odawara (JP); Susumu Tsuruta, Odawara (JP); Daisuke Isobe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 12/289,004

(22) Filed: Oct. 17, 2008

(65) Prior Publication Data

US 2010/0057948 A1    Mar. 4, 2010

(30) Foreign Application Priority Data

Aug. 26, 2008   (JP) .................................. 2008-216339

(51) Int. Cl.
*G03F 3/00*       (2006.01)

(52) U.S. Cl. ................. 710/20; 710/16; 710/17; 710/18; 710/19; 710/22; 713/1; 713/320; 711/112; 711/170; 711/114

(58) Field of Classification Search .............. 710/16–20, 710/22; 713/1, 320; 711/112, 170, 117
See application file for complete search history.

(56) References Cited

U.S. PATENT DOCUMENTS

| 6,583,947 B1* | 6/2003 | Hakamata et al. ............. 360/69 |
| 7,543,108 B2* | 6/2009 | Kakihara et al. .............. 711/112 |
| 7,558,988 B2* | 7/2009 | Ishii et al. ..................... 714/42 |
| 7,639,493 B2* | 12/2009 | Hori et al. ................... 361/679.4 |
| 7,793,042 B2* | 9/2010 | Reeves et al. ................. 711/114 |
| 7,856,526 B2* | 12/2010 | Shibayama et al. .......... 711/112 |
| 2007/0079063 A1 | 4/2007 | Mizuno |

FOREIGN PATENT DOCUMENTS

JP    2007-102409    10/2005

OTHER PUBLICATIONS

Weddle, Charles. Paraid: The Gear-Shifting Power-Aware Raid. The Florida State University College of Arts and Sciences [online] Jun. 2005, [retrieved on Oct. 11, 2007]. Retrieved from the Internet /www.charlesweddle.com/s-misc/doc/paraid.pdf>.*

* cited by examiner

*Primary Examiner* — Tammara Peyton
(74) *Attorney, Agent, or Firm* — Stites & Harbison PLLC; Juan Carlos A. Marquez, Esq.

(57) ABSTRACT

A storage control apparatus capable of reducing a power consumption in network port units, including a host communication control unit 10 which includes a plurality of network ports 18 and which controls communications with a host computer 2 that is connectable through the network ports, a storage-device communication control unit 16 which controls communications with a plurality of storage devices, a plurality of DMA portions 111 by which data to be transmitted/received between the host computer and the storage devices are transferred between the host communication control unit 10 and the storage-device communication control unit 16, a plurality of cache memories 12 in which the data to be transferred by the DMA portions 111 are temporarily stored, and a power saving control portion 110 which stops the DMA portion 111 and the cache memory 12 that are previously associated with one network port, on the basis of a connection situation of the pertinent network port with the host computer and a data rate to be inputted/outputted to/from the pertinent port.

16 Claims, 16 Drawing Sheets

STORAGE CONTROL APPARATUS HAVING POWER SAVING CONTROLLER WHICH STOPS PARTICULAR DATA TRANSFERS BASED ON CONNECTION AND DATA TRANSFER RATES

CROSS REFERENCES TO RELATED APPLICATIONS

This application relates to and claims priority from Japanese Patent Application No. 2008-216339, filed on Aug. 26, 2008, the entire disclosure of which is incorporated herein by reference.

BACKGROUND OF THE INVENTION

1. Field of the Invention

The present invention relates to a storage control apparatus.

2. Description of the Related Art

A storage control apparatus has the function of creating a plurality of logical volumes which are logical areas for inputting/outputting data, on the storage areas of a plurality of storage devices, and then offering the created logical volumes to a host computer. Such a storage control apparatus includes a controller which controls the inputs/outputs of the data to/from the logical volumes, in compliance with requests from the host computer. In recent years, enlargement in the capacity of the storage areas in the storage control apparatus has proceeded, and further reduction in a power consumption has been required of the storage control apparatus.

Patent Document 1 (being JP-A-2007-102409) discloses a technique wherein the power supplies of a plurality of controllers disposed in a storage control apparatus are controlled in accordance with the load of the storage control apparatus, thereby to reduce a power consumption.

SUMMARY OF THE INVENTION

In Patent Document 1, when the power supplies of the plurality of controllers are controlled, they are controlled in controller units. Accordingly, in a case where each of the controllers includes a plurality of network ports, the power supply of the controller cannot be stopped unless the operations of all the network ports have ended. In other words, even in a case where one network port is operating, the controller including the operating network port continues to operate in spite of the existence of the network ports which are not operating, so that power is consumed in surplus.

The present invention has been made in order to eliminate the above problem, and it has for its object to provide a storage control apparatus which can reduce a power consumption in network port units.

In order to solve the problem, a storage control apparatus according to the invention includes a first communication control unit which includes a plurality of network ports, and which controls communications with a host computer that is connectable through the network ports; a second communication control unit which controls communications with a plurality of storage devices; a plurality of data transfer units which transfer data that are transmitted/received between the host computer and the storage devices, between the first communication control unit and the second communication control unit; a plurality of temporary storage units which temporarily store the data that are transferred by the data transfer units; and a power saving control unit which stops some of the data transfer units and the temporary storage units that are previously associated with the network ports, on the basis of connection situations of the respective network ports with the host computer.

Thus, it is permitted to stop the data transfer units and the temporary storage units which correspond to the network ports that are not connected with the host computer.

In the storage control apparatus, the power saving control unit can stop some of the data transfer units and the temporary storage units as are previously associated with the network ports, on the basis of the connection situations and data rates which are inputted/outputted to/from the respective network ports.

Thus, it is permitted to stop the data transfer units and the temporary storage units corresponding to the network ports as to which the data rates to be inputted/outputted are small.

In the storage control apparatus, the power saving control unit includes a network-port operation decision unit which receives a connection situation signal indicating the connection situation, from the network port, and which decides whether or not one network port corresponding to the connection situation signal is operating, on the basis of the received connection situation signal; and a data rate decision unit which operates in a case where it has been decided by the network-port operation decision unit that the pertinent network port is operating, to decide whether or not a small data rate state where the data rate inputted/outputted to/from the pertinent network port becomes, at most, a predetermined value has continued for, at least, a predetermined time period; wherein in a case where it has been decided by the data rate decision unit that the small data rate state has continued for, at least, the predetermined time period, the data transfer unit and the temporary storage unit which are previously associated with the pertinent network port can be stopped.

Thus, it is permitted to stop the data transfer unit and the temporary storage unit corresponding to the network port as to which the small data rate state has continued for, at least, the predetermined time period, even when the network port is operating.

In accordance with the invention, a power consumption can be reduced in network port units.

DESCRIPTION OF THE PREFERRED EMBODIMENTS

Now, the preferred embodiment of a storage control apparatus according to the present invention will be described with reference to the accompanying drawings.

Figure 1:
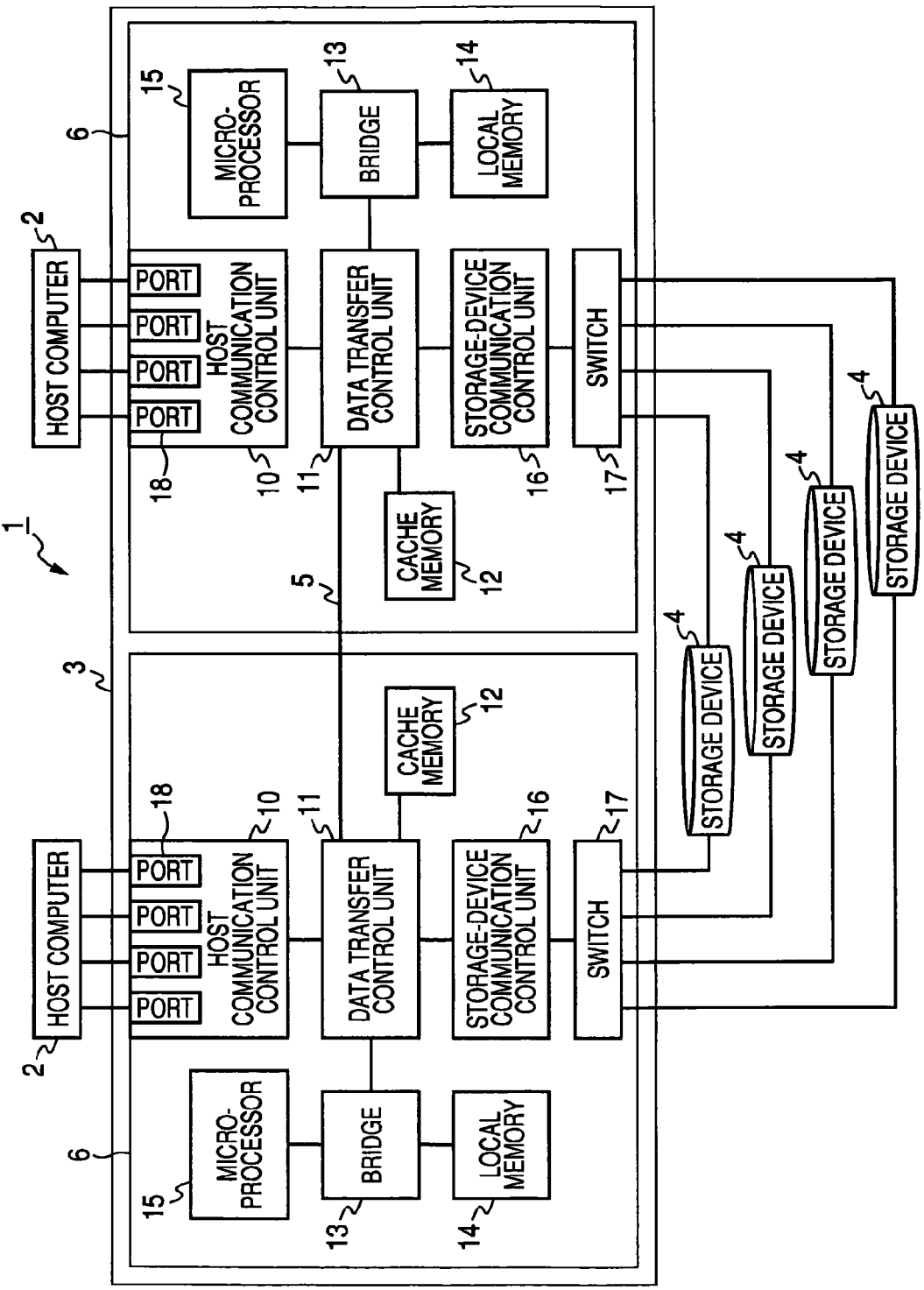
FIG. 1 is a block diagram showing the general configuration of a storage system in an embodiment.

First, there will be described the configuration of a storage system which includes the storage control apparatus in the embodiment. FIG. 1 is a diagram showing the general configuration of the storage system. As shown in the figure, the storage system 1 is configured in such a way that individual host computers 2 are connected to a plurality of storage devices 4 through the storage control apparatus 3.

Each of the host computers 2 is a computer which includes information processing resources, for example, a CPU (Central Processing Unit) and a memory. Concretely, a personal computer, a workstation, a main frame or the like corresponds to the host computer 2. The host computer 2 has network ports for accessing the storage control apparatus 3 (for example, ports which are provided in a LAN card or a host bus adapter). The host computer 2 transmits input/output request commands for data, to the storage control apparatus 3 through the network ports.

The storage control apparatus 3 includes loop-0 and loop-1 controllers 6 to which the different host computers 2 are respectively connected, and an inter-controller connection path 5 which connects the controllers 6 in a communicable state.

A bus which conforms to, for example, the PCI (Peripheral Component Interconnect)-Express Standard can be applied as the inter-controller connection path 5. The exchanges of various data and commands between the loop-0 and loop-1 controllers 6 are performed through the inter-controller connection path 5.

Each of the controllers 6 has the function of controlling the input/output of data to/from the storage devices 4 in compliance with requests from the host computer 2 connected to the controller itself. The controller 6 includes a host communication control unit 10 (first communication control unit), a data transfer control unit 11, a cache memory 12 (temporary storage unit), a bridge 13, a local memory 14, a microprocessor 15, a storage-device communication control unit 16 (second communication control unit), and a switch 17.

The host communication unit 10 is an interface which controls the communications between the controller 6 and the host computer 2. This host communication unit 10 has a plurality of network ports 18. In this embodiment, ports which are provided in an SFP (Small Form-Factor Pluggable) being an optical transceiver are employed as the network ports 18. The SFP is a module which can be detachably attached into the slot of the host communication control unit 10.

A multi-CPU function by which the host communication control unit 10 can communicate with the plurality of microprocessors 15, is installed in the host communication control unit 10. Thus, the host communication control unit 10 can communicate with the microprocessor 15 within the loop-0 controller 6 and the microprocessor 15 within the loop-1 controller 6.

The data transfer control unit 11 has the functions of controlling the data transfer between the loop-0 and loop-1 controllers 6, and the data transfer between the constituents within the loop-0 or loop-1 controller 6. The details of the data transfer control unit 11 will be stated later.

The cache memory 12 is a volatile memory, which is chiefly used for temporarily storing data that are transferred between the host computer 2 and the storage device 4 and between the loop-0 and loop-1 controllers 6.

The bridge 13 is a bridging device which connects the microprocessor 15 and the local memory 14 of its own loop to the data transfer control unit 11 of its own loop, respectively. This bridge 13 is configured of, for example, a microprocessor which transfers the data of the local memory 14 and the microprocessor 15. The local memory 14 is used, not only for storing various control programs, but also for temporarily retaining various commands such as read commands and write commands which are given by the host computer 2.

Each of the microprocessors 15 has the function of controlling the operation of the whole controller 6 of its own loop. The microprocessor 15 processes the read commands and the write commands stored in the local memory 14, in a sequence in which the commands have been stored in the local memory 14. In compliance with the write commands and the read commands retained in the local memory 14, the microprocessor 15 executes processes such as the input/output of data to/from logical volumes which are exclusively allocated to this microprocessor itself. A micro program which controls the microprocessor 15 itself, is saved in the local memory 14 within the same controller 6.

The storage-device communication control unit 16 is an interface which controls communications with the individual storage devices 4. The switch 17 is a switch for changing-over the storage device 4 which becomes a communication destination. The SAS-Expander or the FC loop switch, for example, can be applied as the switch 17. Incidentally, the storage-device communication control unit 16 can be connected with the storage devices 4 by, for example, FC loops replacing the switch 17.

Each of the storage devices 4 is, for example, a hard disk drive. Concretely, a disk array device in which an FC hard disk drive, an SAS hard disk drive, and/or an SATA hard disk drive are/is mounted, or the like corresponds to the storage device 4. A plurality of logical volumes which are logical storage areas for reading and writing data can be set on a memory area which a plurality of hard disk drives provide.

Regarding the logical volumes, a reliability and a response performance can be heightened by applying RAID technology among the plurality of storage devices 4. Concretely, various RAID levels such as "RAID0", "RAID1", "RAID3", "RAID5", "RAID6"and "RAID0+1" can be set for the respective logical volumes.

Figure 2:
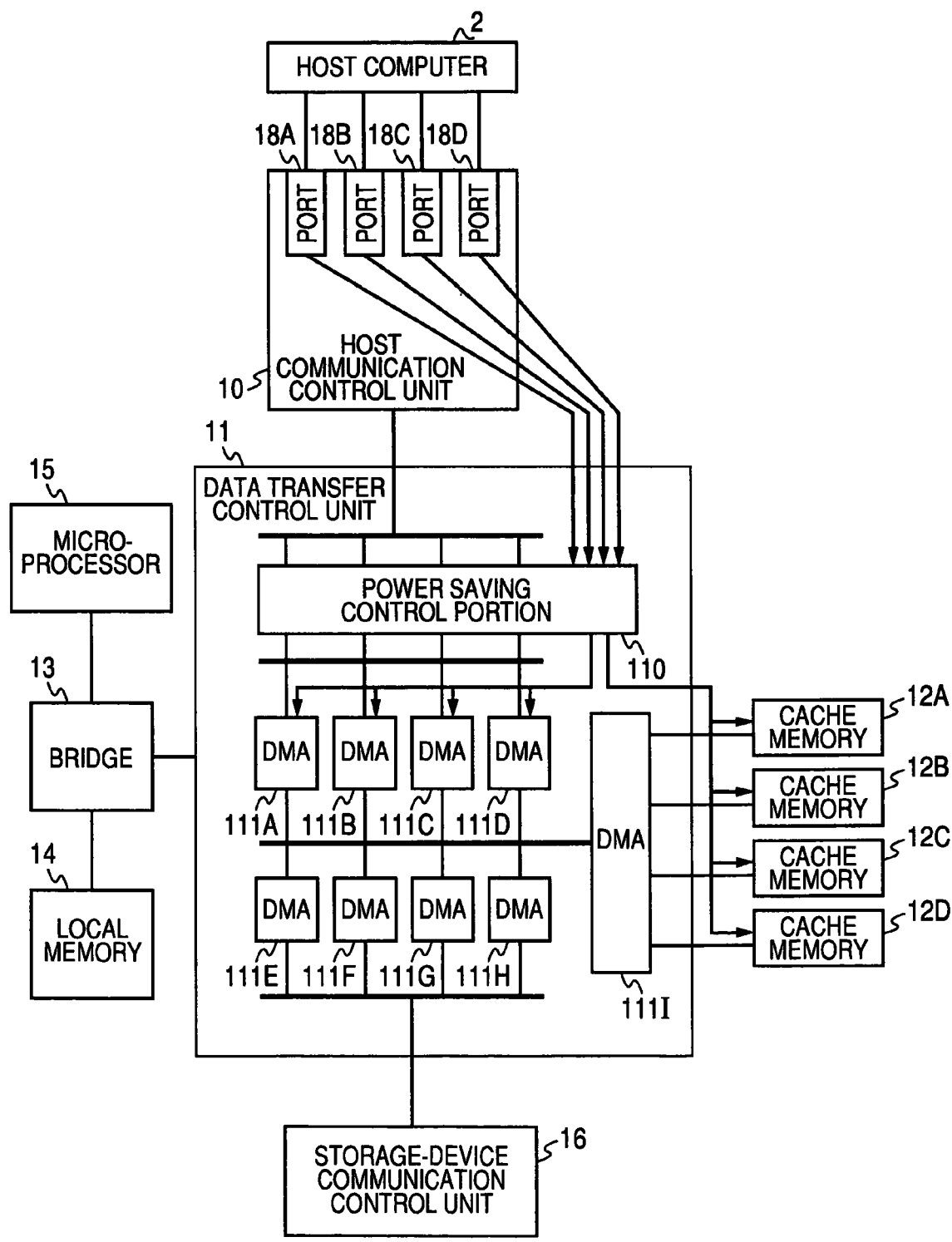
FIG. 2 is a block diagram showing the configuration of a data transfer control unit and the periphery thereof as shown in FIG. 1.

The data transfer control unit 11 of the controller 6 stated above will be described in detail with reference to FIG. 2. This data transfer control unit 11 includes a power saving control portion 110, and a plurality of DMA (Direct Memory Access) portions 111A-111I (data transfer portions). The power saving control portion 110 is electrically connected with the network ports 18A-18D, the DMA portions 111A-111D, and the cache memories 12A-12D, respectively.

The power saving control portion 110 has the function of controlling the operations/stops of the DMA portions 111A-

111D and the cache memories 12A-12D on the basis of the situations of the connections of the respective network ports 18A-18D with the host computer 2, and the rates of data which are inputted/outputted to/from the respective network ports 18A-18D. The details of the power saving control portion 110 will be stated later.

The DMA portions 111A-111I have the function of transferring data which are transmitted and received between the host computer 2 and the storage devices 4, between the host communication control unit 10 and the storage-device communication control unit 16. The DMA portions 111A-111D are ones for the host communication control unit 10, the DMA portions 111E-111H are ones for the storage-device communication control unit 16, and the DMA portion 111I is one for the cache memory 12.

The specified DMA portions 111A-111D and cache memories 12A-12D are respectively associated with the individual network ports 18A-18D, and the data which are inputted/outputted through one network port 18 are transferred by employing the specified DMA portion 111 and cache memory 12 associated with the pertinent network port 18. By way of example, the network port 18A is associated with the DMA portion 111A and the cache memory 12A, and the data which are inputted/outputted through the network port 18A are transferred by employing the DMA portion 111A and cache memory 12A associated with the network port 18A. Likewise, the network port 18B is associated with the DMA portion 111B and the cache memory 12B, the network port 18C is associated with the DMA portion 111C and the cache memory 12C, and the network port 18D is associated with the DMA portion 111D and the cache memory 12D. Such corresponding relations can be set, for example, in such a way that information identifying the DMA portion 111A, and information identifying the cache memory 12A are respectively stored in the local memory 14 in association with information identifying each individual network port 18.

Figure 3:
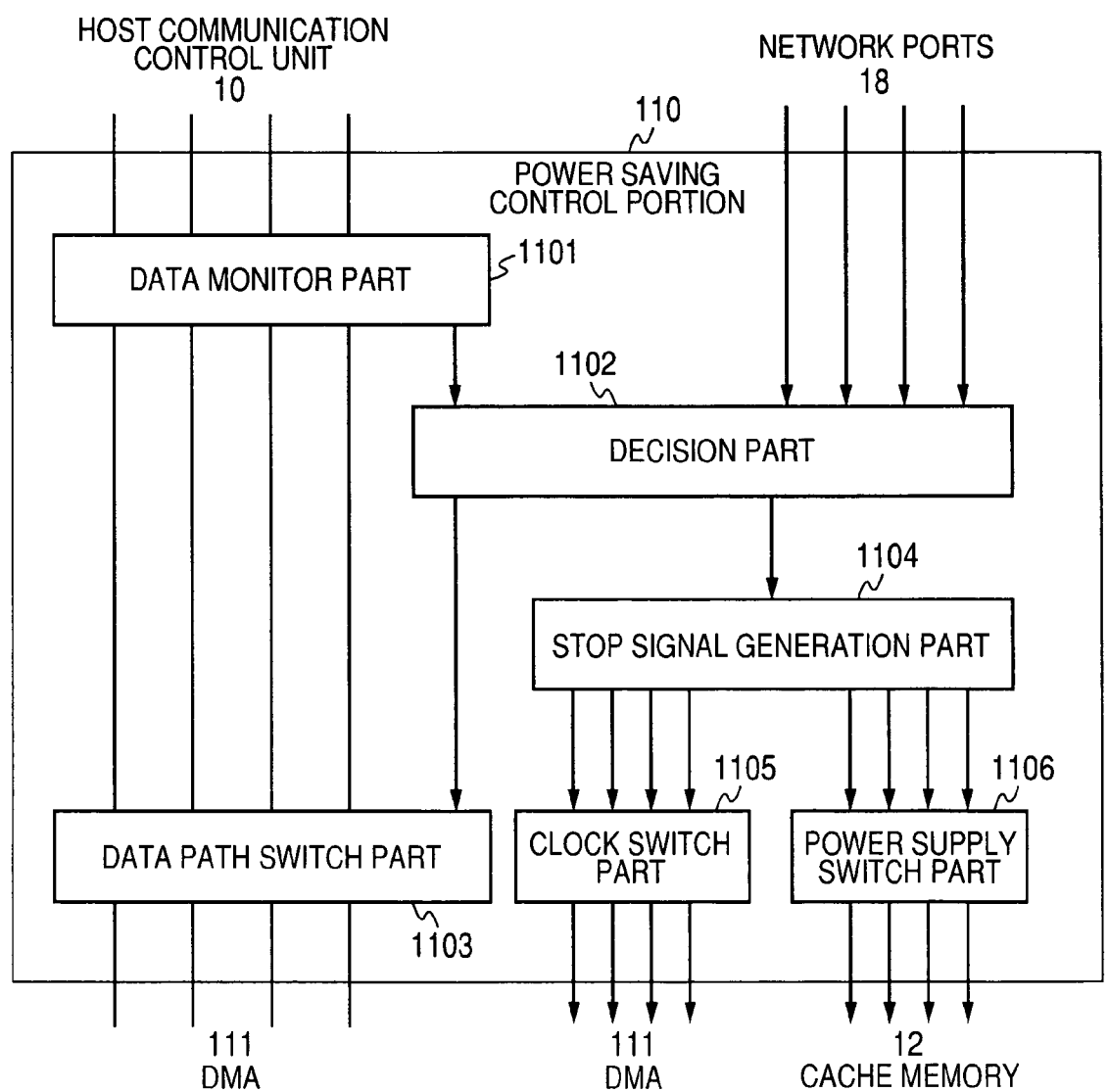
FIG. 3 is a block diagram showing the detailed configuration of a power saving control portion shown in FIG. 2.

The power saving control portion 110 of the data transfer control unit 11 stated above will be described in detail with reference to FIG. 3. The power saving control portion 110 includes a data monitor part 1101, a decision part 1102 (network-port operation decision part, data rate decision part, second data rate decision part, and surplus network-port decision part), a data path switch part 1103, a stop signal generation part 1104, a clock switch part 1105, and a power supply switch part 1106. This power saving control portion 110 is controlled by the microprocessor 15.

The data monitor part 1101 monitors data which are inputted/outputted to/from the individual network ports 18A-18D. This data monitor part 1101 transmits the data rate of the data being monitored, and link information contained in the data, to the decision part 1102. The link information signifies a connection situation signal which indicates whether or not the connection between the network port 18 and the host computer 2 is established.

The decision part 1102 decides whether or not the individual network ports 18A-18D are operating, on the basis of the link information which is transmitted from the data monitor part 1101, and attachment situation information (a connection situation signal) which indicates the presence or absence of the attachment of the SFP transceiver and which is transmitted from each of the network ports 18A-18D. Concretely, in a case where the link information indicates that the connection between the network port 18 and the host computer 2 is established, and where the attachment situation information indicates that the SFP transceiver is attached, the decision part 1102 decides that the corresponding network port 18 is operating.

Subject to the decision that the network port 18 is operating, the decision part 1102 decides whether or not a data rate state where the data rate which is inputted/outputted to/from one operating network port 18 becomes, for example, at most 200 MB/s (a second predetermined value) has continued for, at least, 10 µs (a second predetermined time period). In a case where it has been decided by the decision part 1102 that the data rate state has continued for, at least, 10 µs, the power saving control portion 110 stores surplus existence information indicating that a surplus exists for the data rate which is inputted/outputted to/from one decided network port 18, in the local memory 14 in association with information identifying the pertinent network port 18.

Subject to the decision that the network port 18 is operating, the decision part 1102 decides whether or not a small data rate state where the data rate which is inputted/outputted to/from one operating network port 18 becomes, at most, a predetermined value has continued for, at least, a predetermined time period. In a case where it has been decided by the decision part 1102 that the small data rate state has continued for, at least, the predetermined time period, the power saving control portion 110 stops the DMA portion 111 and the cache memory 12 which correspond to one decided network port 18.

Here, in a case, for example, where the predetermined value is set at 100 MB/s, and where the predetermined time period is set at 10 µs (a first stop lower-limit time period) 1 ms (a second stop lower-limit time period) and 10 ms (a third stop lower-limit time period), the DMA portion 111 and the cache memory 12 can be stopped as stated below. Incidentally, the predetermined value and the predetermined time period are used as criteria in the case of deciding whether or not the DMA portion 111 and the cache memory 12 are to be stopped, and optimum values can be set every system.

In a case where it has been decided by the decision part 1102 that the small data rate state has continued for, at least, 10 µs, the power saving control portion 110 stops the DMA portion 111 corresponding to one network port. Further, in a case where it has been decided by the decision part 1102 that the small data rate state has continued for, at least, 1 ms, the power saving control portion 110 stops the DMA portion 111 corresponding to one network port, and besides, the refresh of the cache memory 12 corresponding to one network port. Still further, in a case where it has been decided by the decision part 1102 that the small data rate state has continued for, at least, 10 ms, the power saving control portion 110 stops the DMA portion 111 corresponding to one network port, and besides, the power supply of the cache memory 12 corresponding to one network port.

This measure consists in that, in order to enhance a processing efficiency at return, the object(s) to be stopped and the stop contents are changed stepwise in accordance with the time periods for which the states where the input/output data rates are small have continued, in consideration of time periods expended on the return. As the time periods expended on the return, the time period expended on the start of the DMA portion becomes the shortest, and the time period expended on the start of the cache memory becomes the longest. Accordingly, when the time period for which the state where the input/output data rate is small has continued is short, the object whose time period expended on the return is short is stopped, and when the time period for which the state where the input/output data rate is small has continued is long, also the object whose time period expended on the return is long is stopped, whereby both power saving and the processing efficiency are made compatible. Incidentally, a contrivance for stopping the DMA portion 111 and the cache memory 12 will be stated later.

In stopping the DMA portion 111 and the cache memory 12 which correspond to one network port 18, the decision part decides whether or not any other network port 18 corresponding to the surplus existence information stored in the local memory 14 is existent. That is, the decision part decides whether or not the other network port 18 which has a surplus for the data rate to-be-inputted/outputted is existent.

In a case where it has been decided by the decision part that the other network port 18 corresponding to the surplus existence information is existent, the data path switch part 1103 causes the DMA portion 111 corresponding to the other network port 18, to transfer the data to be inputted/outputted to/from one network port 18, and it causes the cache memory 12 corresponding to the other network port 18, to store the data. That is, the data path of the data to be inputted/outputted to/from one network port 18 is changed-over from a data path for one network port 18, previously set in correspondence with one network port 18, to a data path for the other network port 18, previously set in correspondence with the other network port 18. In a case where the data path has been changed-over, the power saving control portion 110 turns "ON" a path "changed-over" flag (hereinbelow, a flag shall be sometimes abbreviated to "FLG") The path changed-over FLG is a flag which indicates whether or not the data path of one network port 18 has been changed-over to the data path for the other network port 18. Such path "changed-over" FLGs are respectively stored in the local memory 14 in association with information items identifying the individual network ports 18.

In a case where, after the stops of the DMA portion 111 and the cache memory 12 corresponding to one network port 18, the data rate to be inputted/outputted to/from the pertinent network port 18 has exceeded 100 MB/s (a predetermined value), the power saving control portion 110 changes-over the data path of data to be inputted/outputted to/from one network port 18, from the data path for the other network port 18, to the data path for the pertinent network port 18, and it starts the DMA portion 111 and the cache memory 12 corresponding to the pertinent network port 18. That is, in the case where the small data rate state has been deleted in one network port 18 for which the DMA portion 111 and the cache memory 12 have been stopped, the data path for the pertinent network port 18 is restored to transfer the data.

The contrivance for stopping/starting the DMA portion 111 and the cache memory 12 in accordance with the result of the decision by the decision part 1102 will be concretely described below.

First, in a case where it has been decided by the decision part 1102 that the small data rate state has continued for, at least, 10 μs, the data path switch part 1103 changes-over the DMA portion 111 which is used in transferring data to be inputted/outputted to/from one network port 18, from the DMA portion 111 which is previously set in correspondence with the pertinent network port 18, to the DMA portion 111 which is previously set in correspondence with any other network port 18 where the surplus existence information is set. Subsequently to this processing, the stop signal generation part 1104 generates a clock stop signal for stopping the DMA portion 111 corresponding to one decided network port 18, and it transmits the clock stop signal to the clock switch part 1105. The clock switch part 1105 stops the DMA portion 111 corresponding to the clock stop signal.

In the case where, after the stop of the DMA portion 111, it has been decided by the decision part 1102 that the small data rate state has been deleted, the stop signal generation part 1104 generates a clock restart signal for starting the DMA portion 111 corresponding to one decided network port 18, and it transmits the clock restart signal to the clock switch part 1105. The clock switch part 1105 starts the DMA portion 111 corresponding to the clock restart signal. Subsequently to this processing, the data path switch part 1103 changes-over the DMA portion 111 corresponding to one decided network port 18, from the DMA portion 111 which is previously set in correspondence with any other network port 18 where the surplus existence information is set, to the DMA portion 111 which is previously set in correspondence with the pertinent network port 18.

Figure 4:
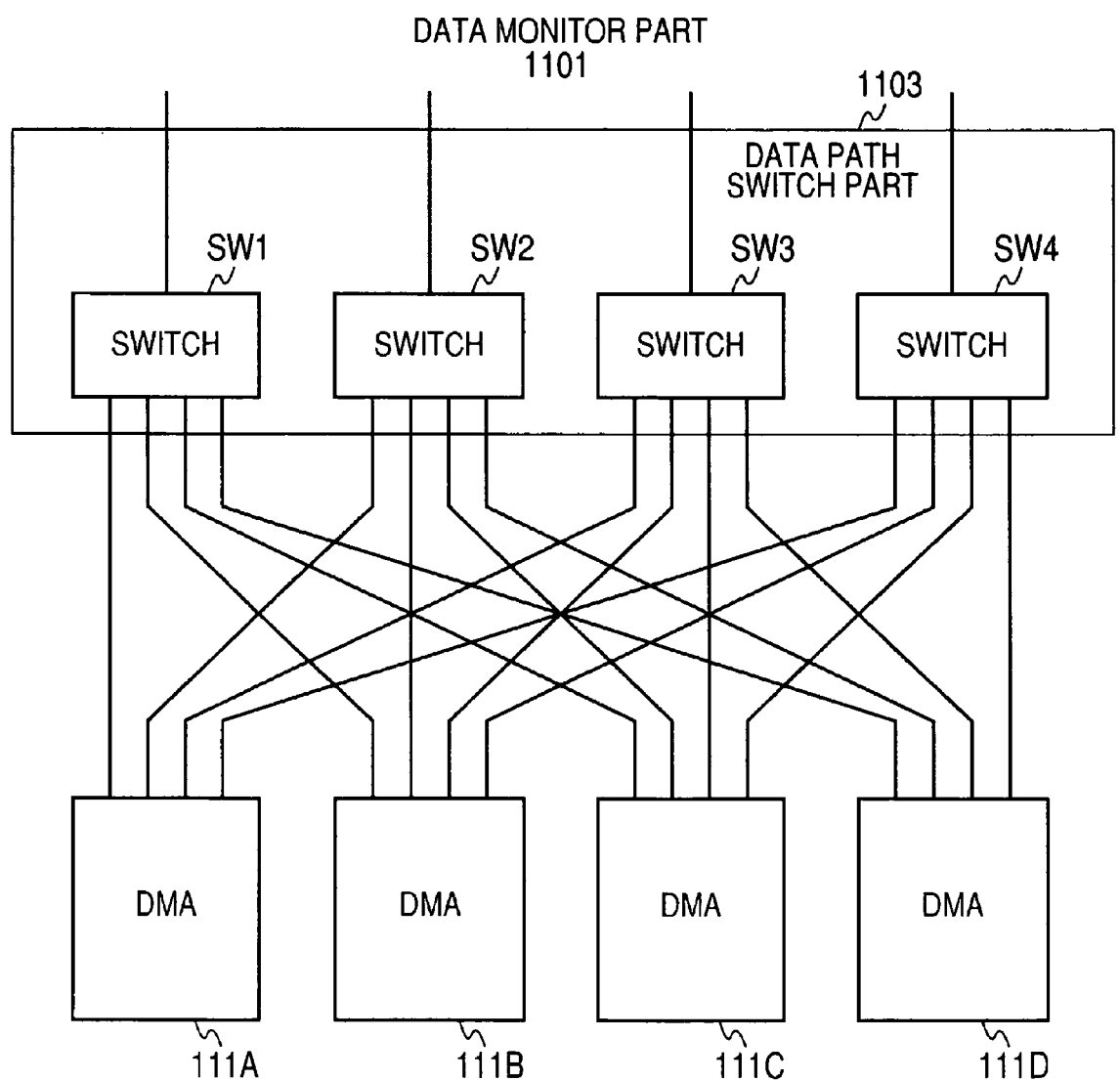
FIG. 4 is a block diagram for explaining a contrivance by which a data path switch part shown in FIG. 3 changes-over a DMA portion.

The contrivance by which the data path switch part 1103 changes-over the DMA portion 111 will be described with reference to FIG. 4. The data path switch part 1103 is provided with the same number of switches SW1-SW4 as that of the DMA portions 111A-111D, and each of the switches SW1-SW4 is designed in a state where it is electrically connectable with the respective DMA portions 111A-111D.

Parameters are previously set for each of the DMA portions 111A-111D. By way of example, the network port which the DMA portion uses, the address of a transfer destination, the presence or absence of a code for a data error check, etc. are set as the parameters. Each of the DMA portions 111A-111D transfers data in accordance with the contents of the parameters which are set in correspondence with its own DMA portion.

At the time of the start of the system, the switch SW1 corresponding to the network port 18A is connected with the DMA portion 111A, the switch SW2 corresponding to the network port 18B is connected with the DMA portion 111B, the switch SW3 corresponding to the network port 18C is connected with the DMA portion 111C, and the switch SW4 corresponding to the network port 18D is connected with the DMA portion 111D. Thereafter, in a case, for example, where the DMA portion 111A is to be stopped and where it has been decided that the surplus existence information is set in the network port 18B, the switch SW1 changes-over its connection destination from the DMA portion 111A to the DMA portion 111B. Concurrently with this processing, the power saving control portion 110 alters the contents of the parameters for the DMA portion 111A, to the contents of the parameters for the DMA portion 111B. Thereafter, in a case where the stopped DMA portion 111A is to be started, the switch SW1 changes-over its connection destination from the DMA portion 111B to the DMA portion 111A. Concurrently with this processing, the power saving control portion 110 restores the contents of the parameters for the DMA portion 111B, to the contents of the parameters for the DMA portion 111A.

Figure 5:
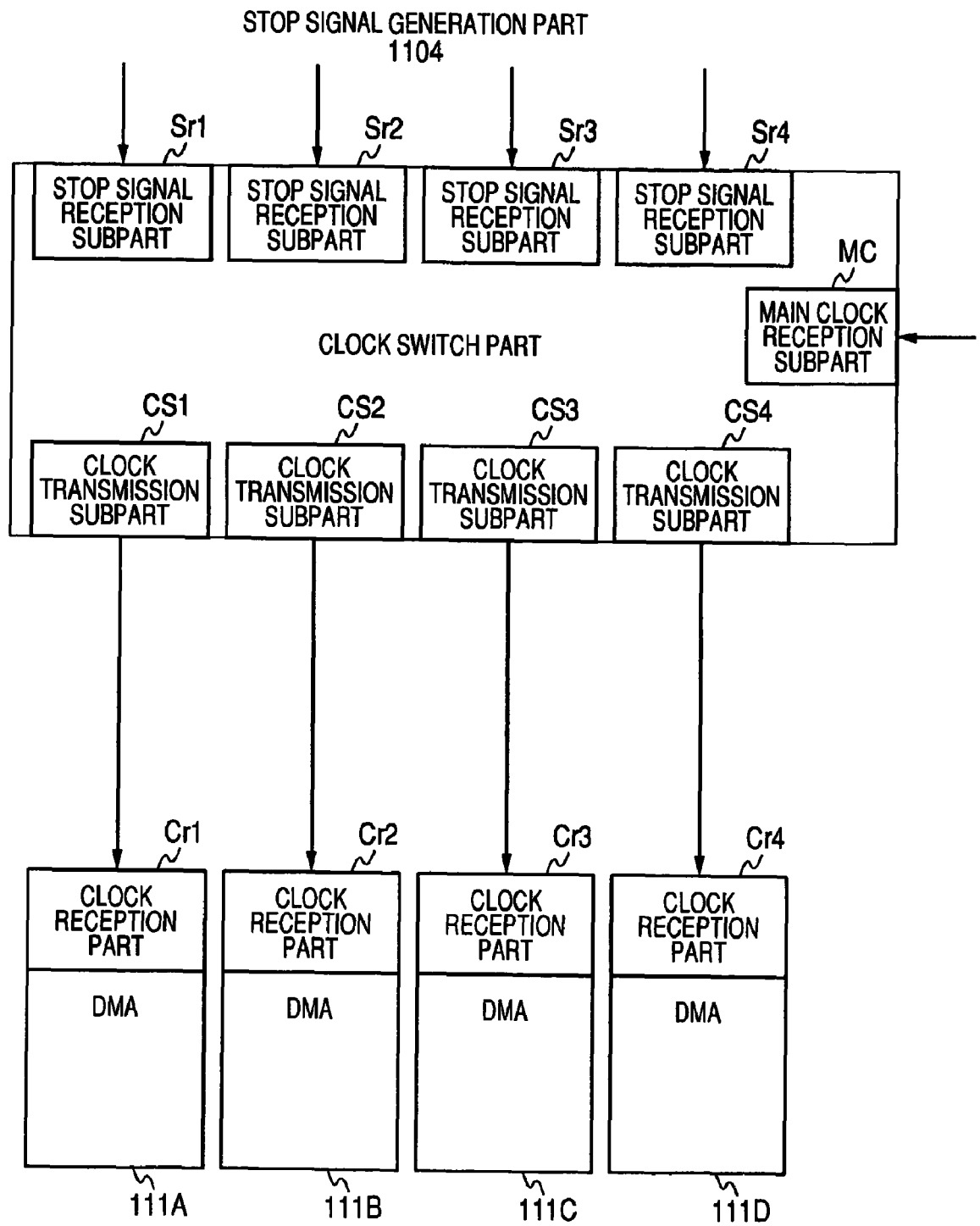
FIG. 5 is a block diagram for explaining a contrivance by which a clock switch part shown in FIG. 3 stops/starts the DMA portion.

The contrivance by which the clock switch part 1105 stops/starts the DMA portion 111 will be described with reference to FIG. 5. The clock switch part 1105 is provided with the same number of stop signal reception subparts Sr1-Sr4 and clock transmission subparts CS1-CS4 as that of the DMA portions 111A-111D, and with a main clock subpart MC. The DMA portions 111A-111D are respectively provided with clock reception parts Cr1-Cr4 which are associated with the respective clock transmission subparts CS1-CS4. The clock transmission subparts CS1-CS4 transmit the main clock of the system to the clock reception parts Cr1-Cr4 corresponding to these clock transmission subparts themselves, respectively. The main clock of the system is received by the main clock reception subpart MC.

In a case where any of the stop signal reception subparts Sr1-Sr4 has received the clock stop signal, the clock transmission subpart CS corresponding to the stop signal reception subpart Sr which has received the clock stop signal suspends the transmission of the main clock. Thus, the DMA portion 111 corresponding to the clock reception part Cr which has become incapable of receiving the main clock is stopped.

In a case where any of the stop signal reception subparts Sr1-Sr4 has received the clock restart signal, the clock transmission subpart CS corresponding to the stop signal reception subpart Sr which has received the clock restart signal restarts the transmission of the main clock. Thus, the DMA portion 111 corresponding to the clock reception part Cr which has become capable of receiving the main clock is started.

Secondly, in a case where it has been decided by the decision part 1102 that the small data rate state has continued for, at least, 1 ms (except in a case where the small data rate state has continued for, at least, 10 ms), the power saving control portion 110 copies dirty data stored in the cache memory 12 corresponding to one decided network port 18, in a predetermined storage area on the storage device 4. The expression "dirty data" signifies data which are not written into the storage device 4 yet, among data written into the cache memory 12. Concurrently with this processing, the power saving control portion 110 changes-over the cache memory 12 which is used in transferring data to be inputted/outputted to/from one network port 18, from the cache memory 12 which is previously set in correspondence with the pertinent network port 18, to the cache memory 12 which is previously set in correspondence with any other network port 18 where the surplus existence information is set. Subsequently to this processing, the stop signal generation part 1104 generates a refresh stop signal for stopping the refresh of the cache memory 12 corresponding to one decided network port 18, and it transmits the refresh stop signal to the power supply switch part 1106. The power supply switch part 1106 stops the refresh of the cache memory 12 corresponding to the refresh stop signal.

In a case where, after the stop of the refresh of the cache memory 12, it has been decided by the decision part 1102 that the small data rate state has been deleted, the stop signal generation part 1104 generates a refresh restart signal for starting the refresh function of the cache memory 12 corresponding to one decided network port 18, and it transmits the refresh restart signal to the power supply switch part 1106. The power supply switch part 1106 starts the refresh function of the cache memory 12 corresponding to the refresh restart signal. Subsequently to this processing, the power saving control portion 110 changes-over the cache memory 12 corresponding to one decided network port 18, from the cache memory 12 which is previously set in correspondence with any other network port 18 where the surplus existence information is set, to the cache memory 12 which is previously set in correspondence with the pertinent network port 18.

Thirdly, in a case where it has been decided by the decision part 1102 that the small data rate state has continued for, at least, 10 ms, the power saving control portion 110 copies dirty data stored in the cache memory 12 corresponding to one decided network port 18, into a predetermined storage area on the storage device 4. Concurrently with this processing, the power saving control portion 110 changes-over the cache memory 12 which is used in transferring data to be inputted/outputted to/from one network port 18, from the cache memory 12 which is previously set in correspondence with the pertinent network port 18, to the cache memory 12 which is previously set in correspondence with any other network port 18 where the surplus existence information is set. Subsequently to this processing, the stop signal generation part 1104 generates a power supply stop signal for stopping the power supply of the cache memory 12 corresponding to one decided network port, and it transmits the power supply stop signal to the power supply switch part 1106. The power supply switch part 1106 stops the power supply of the cache memory 12 corresponding to the power supply stop signal.

In a case where, after the stop of the power supply of the cache memory 12, it has been decided by the decision part 1102 that the small data rate state has been deleted, the stop signal generation part 1104 generates a start signal for starting the cache memory 12 corresponding to one decided network port 18, and it transmits the start signal to the power supply switch part 1106. The power supply switch part 1106 closes the power supply of the cache memory 12 corresponding to the start signal, thereby to start this cache memory. Subsequently to this processing, the power saving control portion 110 changes-over the cache memory 12 corresponding to one decided network port 18, from the cache memory 12 which is previously set in correspondence with the other network port 18 where the surplus existence information is set, to the cache memory 12 which is previously set in correspondence with the pertinent network port 18.

Figure 6:
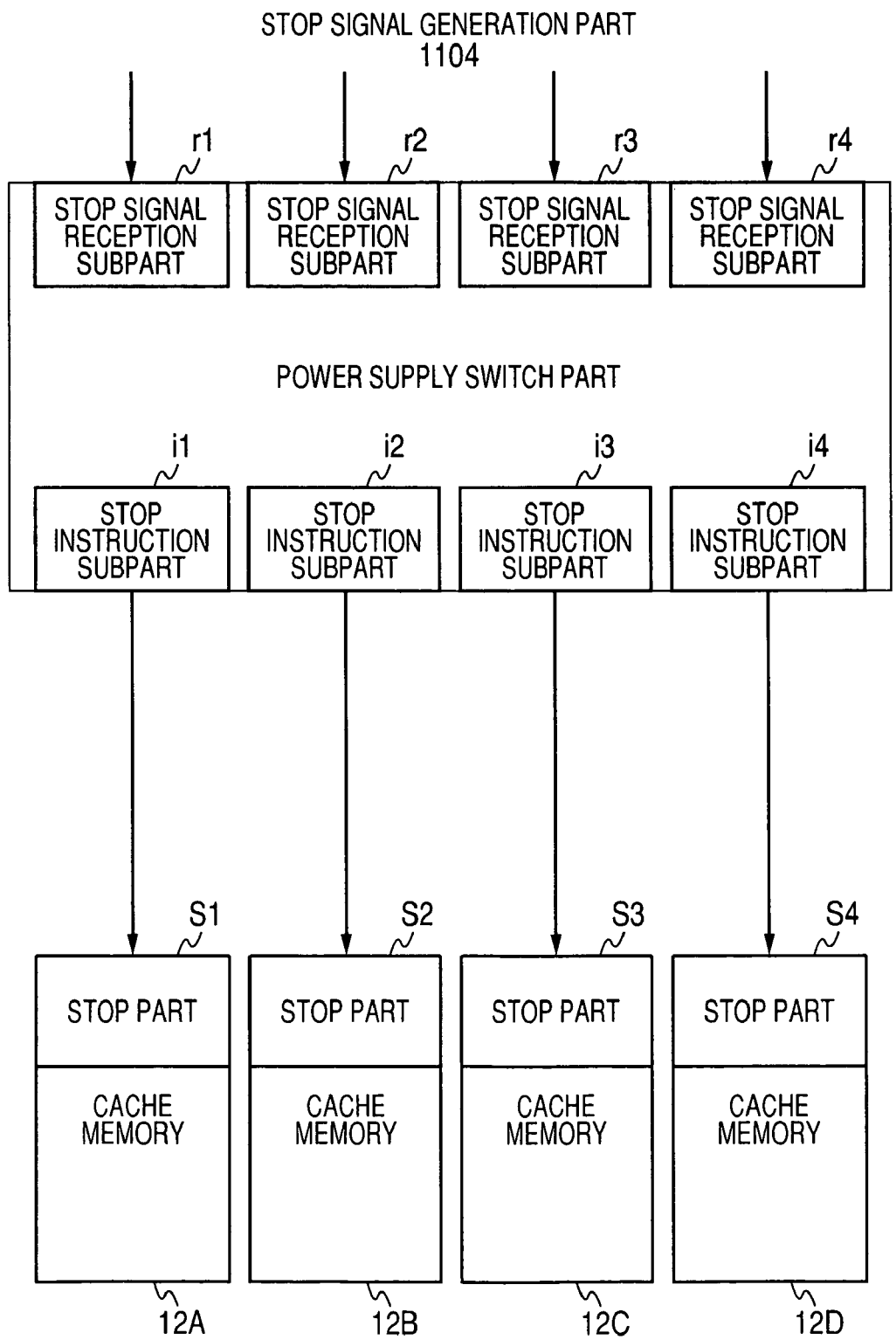
FIG. 6 is a block diagram for explaining a contrivance by which a power supply switch part shown in FIG. 3 stops/starts a cache memory.

The contrivance by which the power supply switch part 1106 of the power saving control portion 110 stops/starts the cache memory 12 will be described with reference to FIG. 6. The power supply switch part 1106 is provided with the same number of stop signal reception subparts r1-r4 and stop instruction subparts i1-i4 as that of the cache memories 12A-12D. The cache memories 12A-12D are respectively provided with stop parts S1-S4 which are associated with the respective stop instruction subparts i1-i4.

In a case where any of the stop signal reception subparts r1-r4 has received the refresh stop signal, the stop instruction subpart i corresponding to the stop signal reception subpart r which has received the refresh stop signal transmits a control signal for stopping the refresh, to the stop part S which corresponds to this stop instruction subpart i itself. The cache memory 12 corresponding to the stop part S which has received the control signal, stops its refresh.

In a case where any of the stop signal reception subparts r1-r4 has received the refresh restart signal, the stop instruction subpart i corresponding to the stop signal reception subpart r which has received the refresh restart signal transmits a control signal for restarting the refresh, to the stop part S which corresponds to the stop instruction subpart i itself. The cache memory 12 corresponding to the stop part S which has received the control signal, starts its refresh function.

In a case where any of the stop signal reception subparts r1-r4 has received the power supply stop signal, the stop instruction subpart i corresponding to the stop signal reception subpart r which has received the power supply stop signal transmits a control signal for stopping the power supply of the cache memory 12, to the stop part S corresponding to the stop instruction subpart i itself. The cache memory 12 corresponding to the stop part S which has received the control signal, stops its power supply.

In a case where any of the stop signal reception subparts r1-r4 has received the start signal, that one of the stop instruction subparts i1-i4 which corresponds to the stop signal reception subpart r having received the start signal transmits a control signal for closing the power supply of the cache memory 12, to the stop part S corresponding to the stop instruction subpart i itself. The cache memory 12 corresponding to the stop part S which has received the control signal, closes its power supply and is started.

Figure 7:
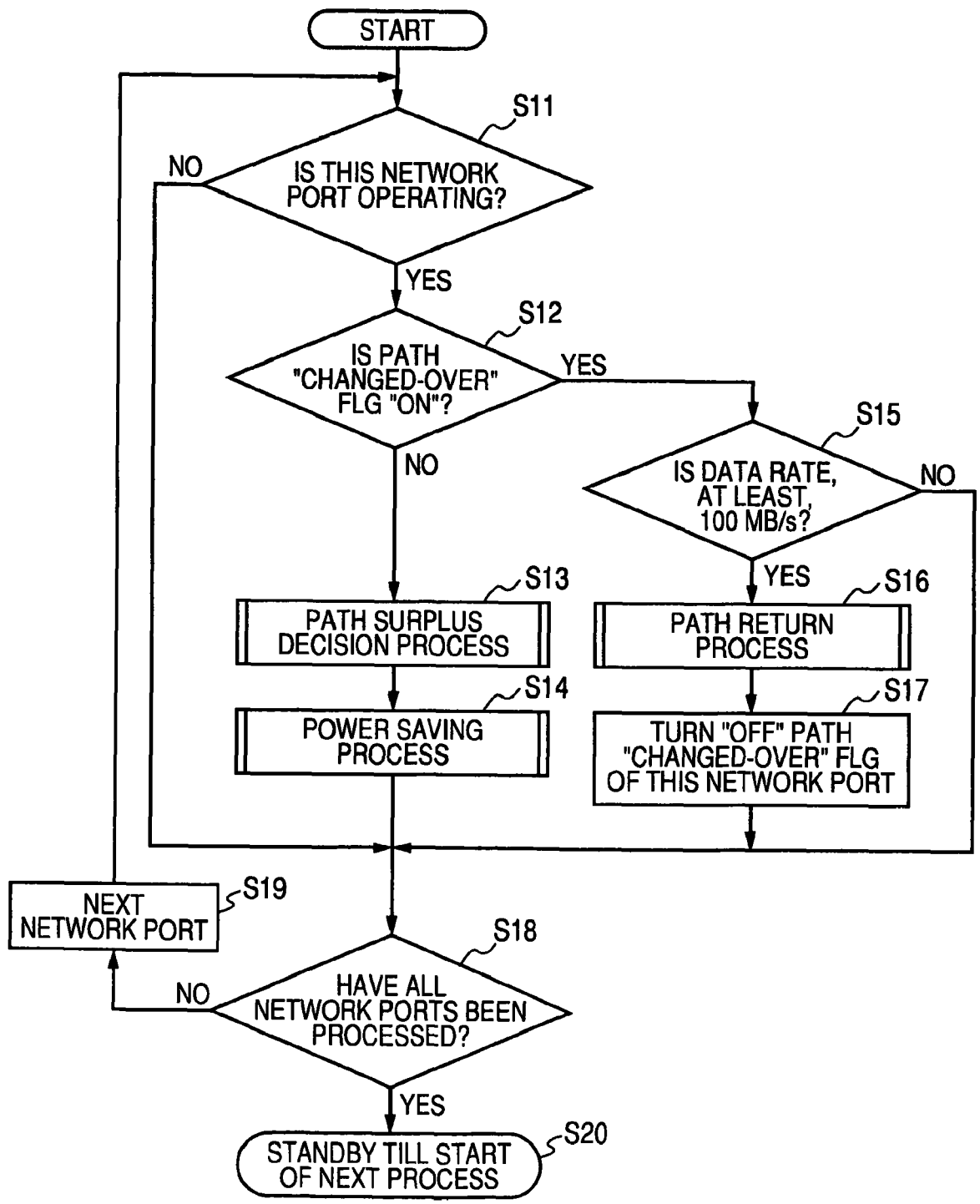
FIG. 7 is a flow chart for explaining a power saving control process.

Next, a power saving control process in the storage system 1 will be described with reference to FIG. 7. FIG. 7 is a flow chart for explaining the power saving control process in this embodiment. In the power saving control process, processes relevant to the respective network ports 18A-18D are successively executed one port by one port. Here, the process concerning the network port 18A will be described from the start thereof.

Initially, the decision part 1102 decides whether or not the network port 18A is operating, on the basis of link information and connection situation information on the network port 18A (step S11). In a case where the decision is "NO" (step S11; NO), the process is shifted to a step S18 which is to be stated later.

On the other hand, in a case where it has been decided at the step S11 that the network port 18A is operating (step S11; YES), the decision part 1102 decides a path "changed-over" FLG corresponding to the network port 18A is "ON" (step S12). In a case where the decision is "NO" (step S12; NO), the power saving control portion 110 executes a path surplus decision process which is to be stated later (step S13), and it executes a power saving process which is to be stated later (step S14).

On the other hand, in a case where it has been decided at the step S12 that the path "changed-over" FLG of the network port 18A is "ON" (step S12; YES), the decision part 1102 decides whether or not a data rate to be inputted/outputted to/from the network port 18A is, at least, 100 MB/s (step S15). In a case where the decision is "NO" (step S15; NO), the process is shifted to the step S18 which is to be stated later.

On the other hand, in a case where it has been decided at the step S15 that the data rate to be inputted/outputted to/from the network port 18A is, at least, 100 MB/s (step S15; YES), the power saving control portion 110 executes a path return process which is to be stated later (step S16), and it turns "OFF" the path "changed-over" FLG corresponding to the network port 18A (step S17).

Subsequently, in a case where the processes concerning all the network ports 18A-18D have not ended (step S18; NO), the object to be processed is shifted to the next network port (step S19). Here, the object to be processed is shifted to the network port 18B.

On the other hand, in a case where the processes concerning all the network ports 18A-18D have ended at the step S18 (step S18; YES), standby is made until the next power saving control process is started (step S20).

Figure 8:
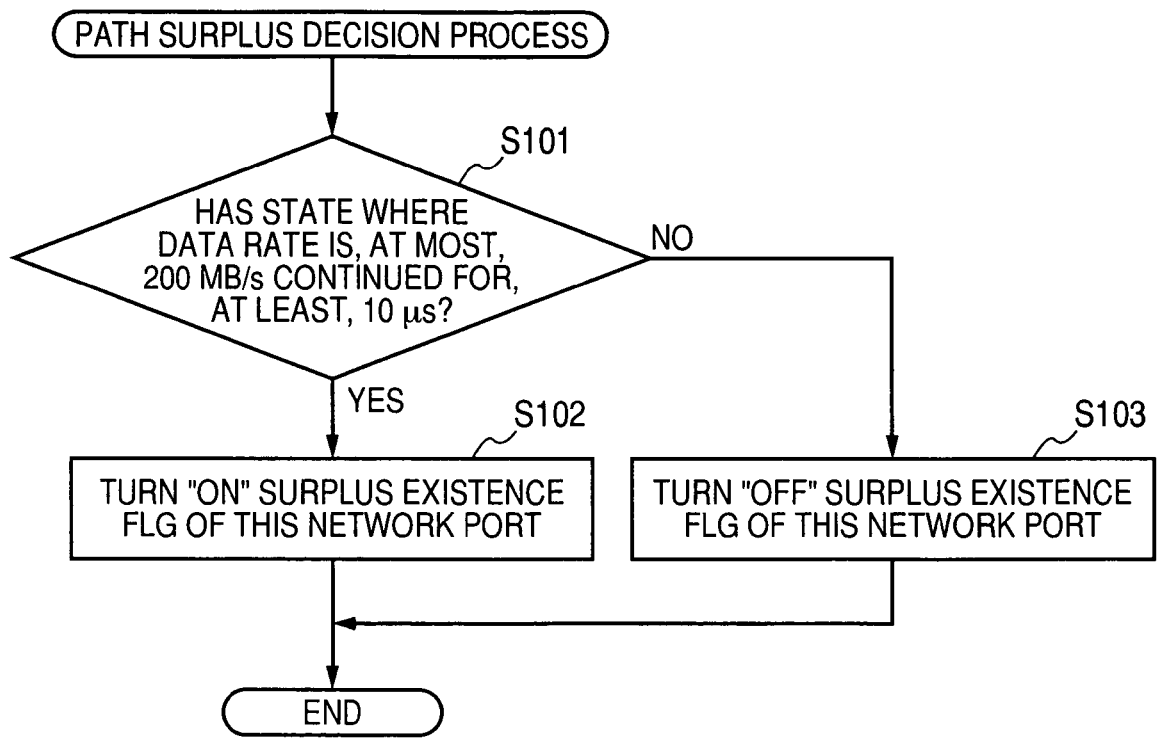
FIG. 8 is a flow chart for explaining a path surplus decision process indicated in FIG. 7.

Next, the path surplus decision process mentioned above will be described with reference to FIG. 8. FIG. 8 is a flow chart for explaining the contents of the path surplus decision process at the step S13 in FIG. 7.

Initially, the decision part 1102 decides whether or not a state where the data rate inputted/outputted to/from the network port 18A becomes, at most, 200 MB/s has continued for, at least, 10 μs (step S110). In a case where the decision is "YES" (step S101; YES), the power saving control portion 110 turns "ON" the path "changed-over" FLG which corresponds to the network port 18A (step S102). On the other hand, in a case where the decision is "NO" (step S101; NO), the power saving control portion 110 turns "OFF" the path "changed-over" FLG which corresponds to the network port 18A (step S103).

Figure 9:
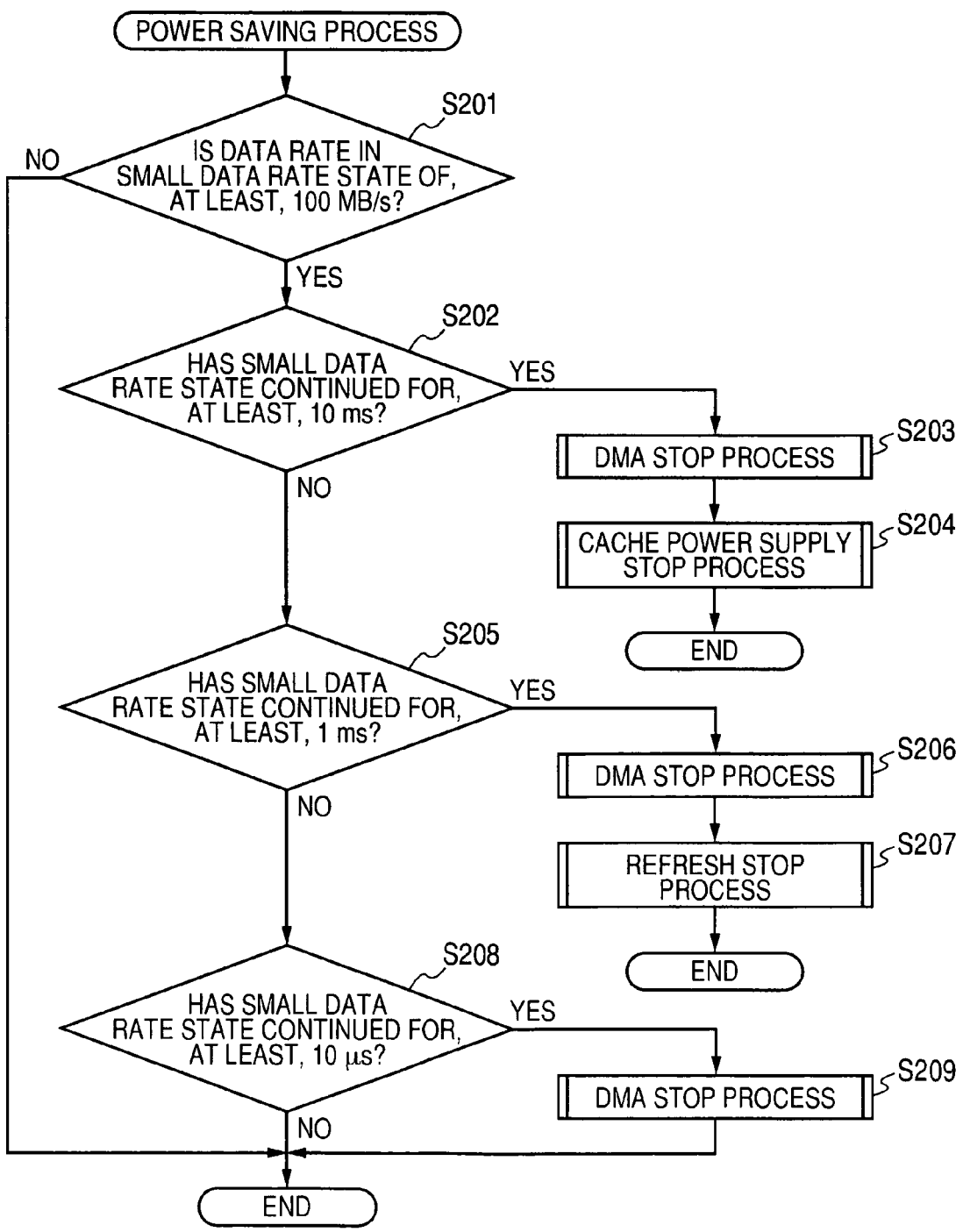
FIG. 9 is a flow chart for explaining a power saving process indicated in FIG. 7.

Next, the power saving process mentioned above will be described with reference to FIG. 9. FIG. 9 is a flow chart for explaining the contents of the power saving process at the step S14 in FIG. 7.

Initially, the decision part 1102 decides whether or not a data rate which is inputted/outputted to/from the network port 18A is in a small data rate state of, at most, 100 MB/s (step S201). In a case where the decision is "NO" (step S201; NO), the power saving process is ended.

On the other hand, in a case where it has been decided at the step S201 that the data rate which is inputted/outputted to/from the network port 18A is in the small data rate state (step S201; YES), the decision part 1102 decides whether or not the small data rate state has continued for, at least, 10 ms (step S202). In a case where the decision is "YES" (step S202; YES), the power saving control portion 110 executes a DMA stop process which is to be stated later (step S203), and it executes a cache power supply stop process which is to be stated later (step S204), whereupon the power saving process is ended.

On the other hand, in a case where it has been decided at the step S202 that the small data rate state has continued for less than 10 ms (step S202; NO), the decision part 1102 decides whether or not the small data rate state has continued for, at least, 1 ms (step S205). In a case where the decision is "YES" (step S205; YES), the power saving control portion 110 executes a DMA stop process which is to be stated later (step S206), and it executes a refresh stop process which is to be stated later (step S207), whereupon the power saving process is ended.

On the other hand, in a case where it has been decided at the step S205 that the small data rate state has continued for less than 1 ms (step S205; NO), the decision part 1102 decides whether or not the small data rate state has continued for, at least, 10 μs (step S208). In a case where the decision is "YES" (step S208; YES), the power saving control portion 110 executes a DMA stop process which is to be stated later (step S209), whereupon the power saving process is ended.

Figure 10:
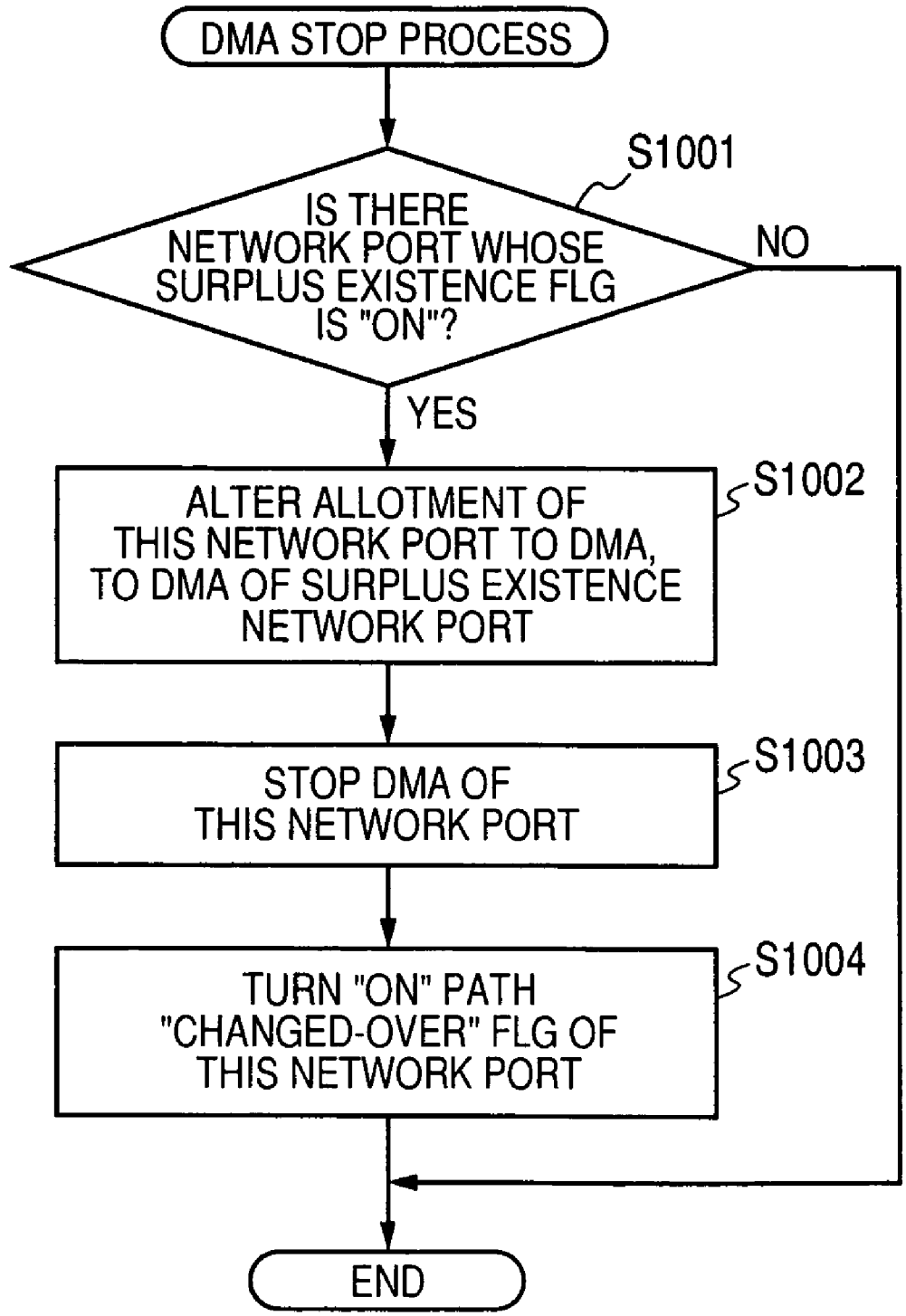
FIG. 10 is a flow chart for explaining a DMA stop process indicated in FIG. 9.

Next, the DMA stop process mentioned above will be described with reference to FIG. 10. FIG. 10 is a flow chart for explaining the contents of the DMA stop process at the step S203, S206 or S209 in FIG. 9. Here will be described a case where surplus existence information is set for the network port 18B.

Initially, the decision part 1102 decides whether or not there is any of the other network ports 18B-18D as corresponds to the surplus existence information stored in the local memory 14 (step S1001). In a case where the decision is "NO" (step S1001; NO), the DMA stop process is ended.

On the other hand, in a case where it has been decided at the step S1001 that there is the other network port 18B corresponding to the surplus existence information (step S1001; YES), the switch SW1 of the data path switch part 1103 alters the allotment of its connection destination from the DMA 111A to the DMA 111B which corresponds to the other network port 18B (step S1002).

Subsequently, the clock switch part 1105 stops the DMA 111A which corresponds to a clock stop signal generated by the stop signal generation part 1104 (step S1003).

Subsequently, the power saving control portion 110 turns "ON" of a path "changed-over" FLG corresponding to the network port 18A (step S1004), whereupon the DMA stop process is ended.

Figure 11:
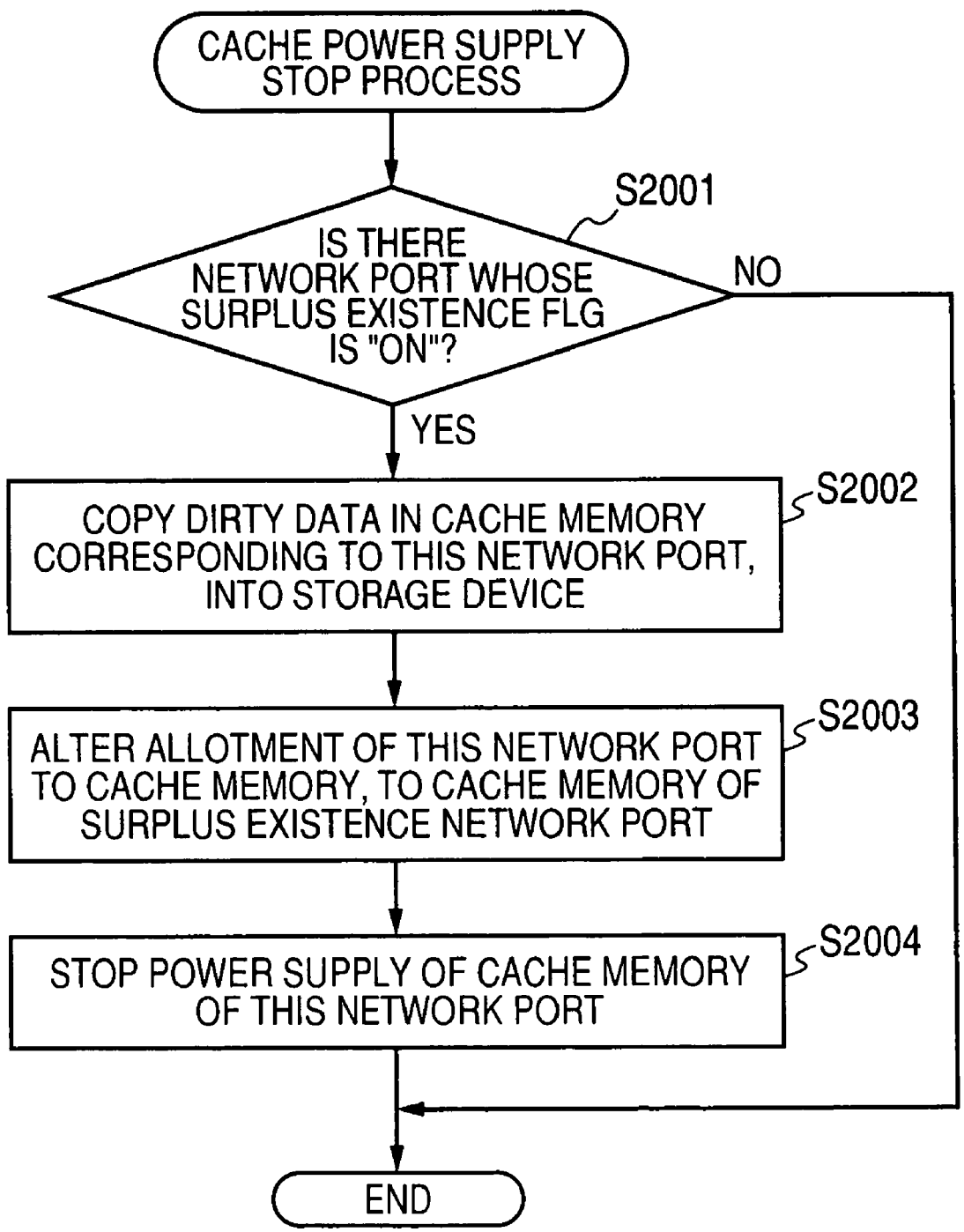
FIG. 11 is a flow chart for explaining a cache power supply stop process indicated in FIG. 9.

Next, the cache power supply stop process mentioned above will be described with reference to FIG. 11. FIG. 11 is a flow chart for explaining the contents of the cache power supply stop process at the step S204 in FIG. 9. Here will be described a case where surplus existence information is set for the network port 18B.

Initially, the decision part 1102 decides whether or not there is any of the other network ports 18B-18D as corresponds to the surplus existence information stored in the local memory 14 (step S2001). In a case where the decision is "NO" (step S2001; NO), the cache power supply stop process is ended.

On the other hand, in a case where it has been decided at the step S2001 that there is the other network port 18B corresponding to the surplus existence information (step S2001; YES), the power saving control portion 110 copies dirty data stored in the cache memory 12A corresponding to the network port 18A, into a predetermined storage area on the storage device 4 (step S2002).

Subsequently, the power saving control portion 110 alters the allotment of the network port 18A to the cache memory, from the cache memory 12A to the cache memory 12B which corresponds to the other network port 18B (step S2003).

Subsequently, the power supply switch part 1106 stops the power supply of the cache memory 12A which corresponds to a power supply stop signal generated by the stop signal generation part 1104 (step S2004), whereupon the cache power supply stop process is ended.

Figure 12:
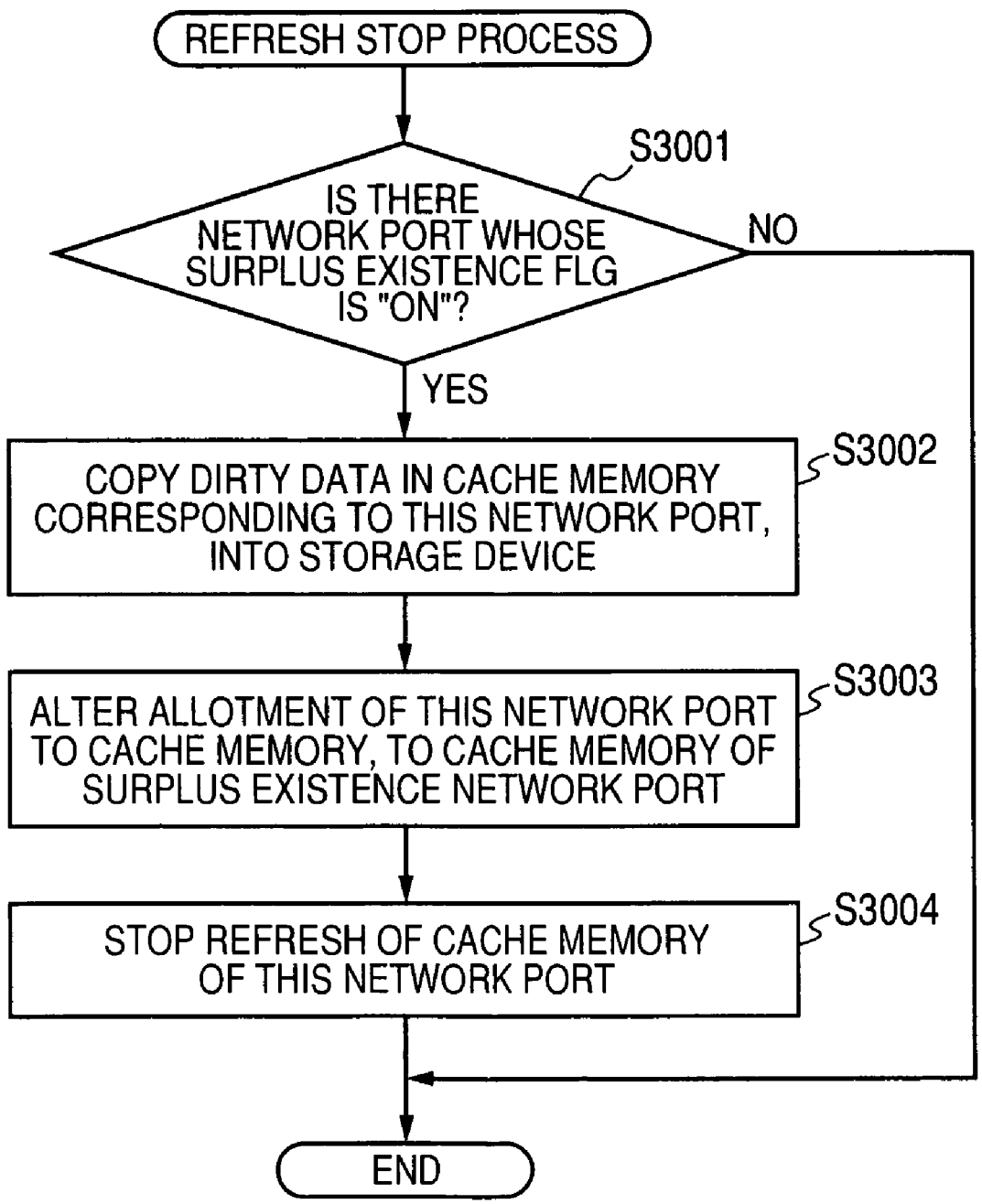
FIG. 12 is a flow chart for explaining a refresh stop process indicated in FIG. 9.

Next, the refresh stop process mentioned above will be described with reference to FIG. 12. FIG. 12 is a flow chart for explaining the contents of the refresh stop process at the step S207 in FIG. 9. Here will be described a case where surplus existence information is set for the network port 18B.

Initially, the decision part 1102 decides whether or not there is any of the other network ports 18B-18D as corresponds to the surplus existence information stored in the local memory 14 (step S3001). In a case where the decision is "NO" (step S3001; NO), the refresh stop process is ended.

On the other hand, in a case where it has been decided at the step S3001 that there is the other network port 18B corresponding to the surplus existence information (step S3001; YES), the power saving control portion 110 copies dirty data stored in the cache memory 12A corresponding to the network port 18A, into a predetermined storage area on the storage device 4 (step S3002).

Subsequently, the power saving control portion 110 alters the allotment of the network port 18A to the cache memory, from the cache memory 12A to the cache memory 12B which corresponds to the other network port 18B (step S3003).

Subsequently, the power supply switch part 1106 stops the refresh of the cache memory 12A which corresponds to a refresh stop signal generated by the stop signal generation part 1104 (step S3004), whereupon the refresh stop process is ended.

Figure 13:
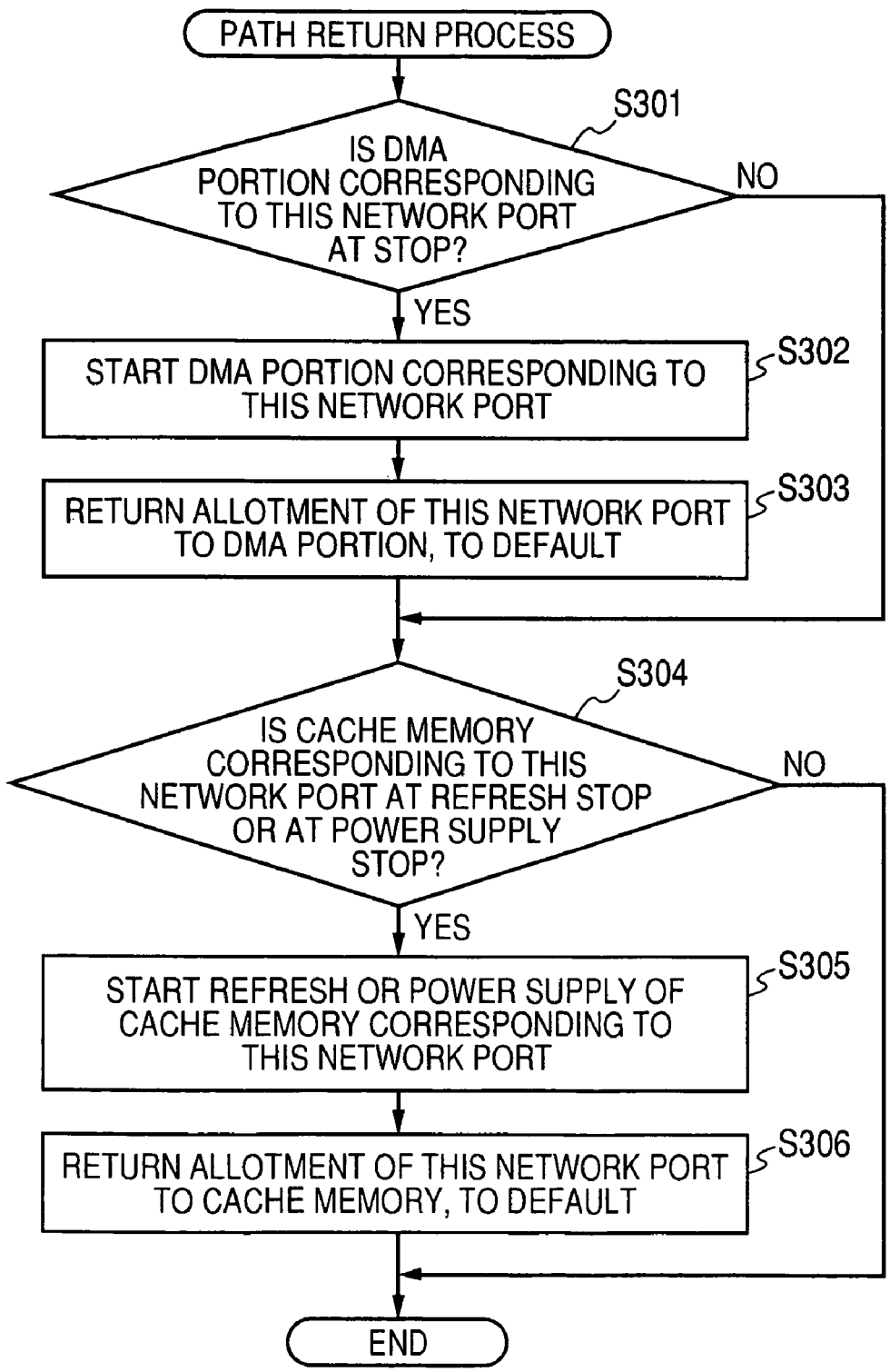
FIG. 13 is a flow chart for explaining a path return process indicated in FIG. 7.

Next, the path return process mentioned above will be described with reference to FIG. 13. FIG. 13 is a flow chart for explaining the contents of the path return process at the step S16 in FIG. 7.

Initially, the decision part 1102 decides whether or not the DMA portion 111A corresponding to the network port 18A is at a stop (step S301). In a case where the decision is "NO" (step S301; NO), the process is shifted to a step S304 which is to be stated later.

On the other hand, in a case where it has been decided at the step S301 that the DMA portion 111A is at the stop (step S301; YES), the power saving control portion 110 starts the DMA portion 111A (step S302), and it returns the allotment of the DMA portion corresponding to the network port 18A, to the DMA portion 111A which is previously set in association with the network port 18A (step S303).

Subsequently, the decision part 1102 decides whether or not the cache memory 12A corresponding to the network port 18A is at a refresh stop or a power supply stop (step S304). In a case where the decision is "NO" (step S304; NO), the path return process is ended.

On the other hand, in a case where it has been decided at the step S304 that the cache memory 12A is at the refresh stop or the power supply stop (step S304; YES), the power saving control portion 110 starts the refresh function of the cache memory 12A, or it closes the power supply of the cache memory 12A and starts this cache memory (step S305).

Subsequently, the power saving control portion 110 returns the allotment of the cache memory corresponding to the network port 18A, to the cache memory 12A which is previously set in association with the network port 18A (step S306), whereupon the path return process is ended.

As thus far described, in the storage control apparatus 3 in the embodiment, it is possible to stop the DMA portion 111 and the cache memory 12 which correspond to one network port 18 having a small input/output data rate. Thus, it is permitted to reduce a power consumption in network port units.

Besides, in the storage control apparatus 3 in the embodiment, in stopping the DMA portion 111 and the cache memory 12, data to be inputted/outputted to/from one network port 18 can be transferred using the DMA portion 111 and the cache memory 12 which correspond to any other network port 18 having a surplus in an input/output data rate. Thus, even in a case where some of the DMA portions 111 and cache memories 12 have been stopped, data can be reliably transferred.

Further, in the storage control apparatus 3 in the embodiment, in a case where the continuation time period of a small data rate state is, at least, 10 µs, only the DMA portion 111 is stopped; in a case where the continuation time period of the small data rate state is, at least, 1 ms, the refresh of the cache memory 12 is stopped in addition to the DMA portion 111; and in a case where the continuation time period of the small data rate state is, at least, 10 ms, the power supply of the cache memory 12 is stopped in addition to the DMA portion 111. Therefore, the objects can be stopped stepwise from one which expends a comparatively short time period for its return from its stop state, and a processing efficiency at the time of the return can be enhanced.

[Modifications]

By the way, in the foregoing embodiment, when the DMA portion 111 and the cache memory 12 are to be stopped, the data rate of each network port 18 is set as a condition, but the data rate need not always be set as the condition. By way of example, the DMA portion 111 and the cache memory 12 may well be stopped by imposing a condition of whether or not the link of the network port has been established. Besides, the DMA portion 111 and the cache memory 12 may well be stopped by imposing a condition of whether or not an SFP transceiver has been attached. Further, these conditions may well be combined. That is, the DMA portion 111 and the cache memory 12 may be stoppable in accordance with the connection situation of each network port 18, as long as data transfer can be reliably performed as the whole system.

Here, in the storage control apparatus 3, the power saving control portion 110 is electrically connected with the network ports 18A-18D, the DMA portions 111A-111D and the cache memories 12A-12D, respectively, whereby the power saving control process can be controlled by hardware. Accordingly, the DMA portions 111A-111D and the cache memories 12A-12D can be stopped in accordance with the attachment situations of the SFP transceivers corresponding to the network ports. Thus, the power saving control process can be executed under the initiative of the side of the storage control apparatus 3, not under the initiative of the side of the host computer 2.

Figure 14:
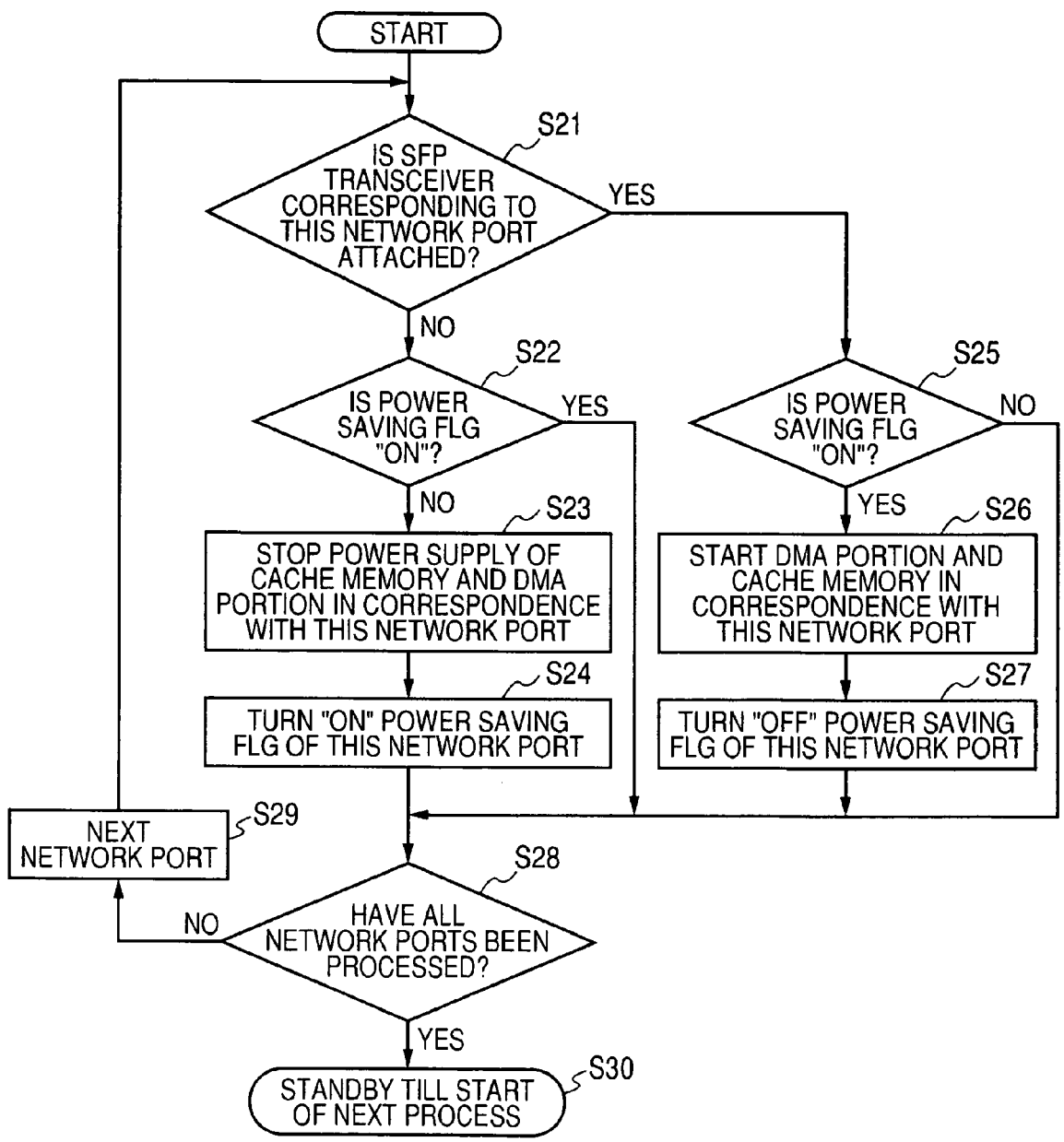
FIG. 14 is a flow chart for explaining a power saving control process in a modified embodiment.

A power saving control process in the case where the DMA portion 111 and the cache memory 12 are stopped by imposing the condition of whether or not the SFP transceiver is attached, will be described with reference to FIG. 14. FIG. 14 is a flow chart for explaining the power saving control process in this modified embodiment. In the power saving control process, processes relevant to the respective network ports 18A-18D are successively executed one port by one port. Here, the process concerning the network port 18A will be described from the start thereof.

Initially, the decision part 1102 decides whether or not the SFP transceiver corresponding to the network port 18A is attached, on the basis of attachment situation information on the network port 18A (step S21). In a case where the decision is "NO" (step S21; NO), the decision part 1102 decides whether or not a power saving FLG corresponding to the network port 18A is "ON" (step S22). In a case where it has been decided here that the power saving FLG is "OFF" (step S22; NO), the power saving control portion 110 stops the power supply of the cache memory 12A corresponding to the network port 18A and also stops the DMA portion 111A corresponding to the network port 18A (step S23). In addition, the power saving control portion 110 turns "ON" the power saving FLG corresponding to the network port 18A (step S24).

On the other hand, in a case where it has been decided at the step S21 that the SFP transceiver corresponding to the network port 18A is attached (step S21; YES), the decision part 1102 decides whether or not the power saving FLG corresponding to the network port 18A is "ON" (step S25). In a case where it has been decided here that the power saving FLG is "ON" (step S25; YES), the power saving control portion 110 starts the DMA portion 111A corresponding to the network port 18A and closes the power supply of the cache memory 12A corresponding to the network port 18A, thereby to start this cache memory 12A (step S26). In addition, the power saving control portion 110 turns "OFF" the power saving FLG corresponding to the network port 18A (step S27).

Subsequently, in a case where the processes concerning all the network ports 18A-18D have not ended (step S28; NO), the object to be processed is shifted to the next network port (step S29). On the other hand, in a case where the processes concerning all the network ports 18A-18D have ended (step S28; YES), standby is made until the next power saving control process is started (step S30).

In this manner, in the case where the DMA portion 111 and the cache memory 12 are stopped by imposing the condition of whether or not the SFP transceiver is attached, whether or not the SFP transceiver corresponding to one network port 18 is attached is decided, and the DMA portion 111 and the cache memory 12 corresponding to the pertinent network port 18 can be stopped when the SFP transceiver is not attached. Thus, it is permitted to reduce a power consumption in network port units. Further, it is dispensed with, for example, to monitor a data rate or to change-over a data path, so that a system configuration can be simplified. Incidentally, also in a case where the DMA portion 111 and the cache memory 12 are stopped by imposing a condition of whether or not the link of the network port has been established, a process can be executed similarly to the above, and similar advantages can be attained.

Figure 15:
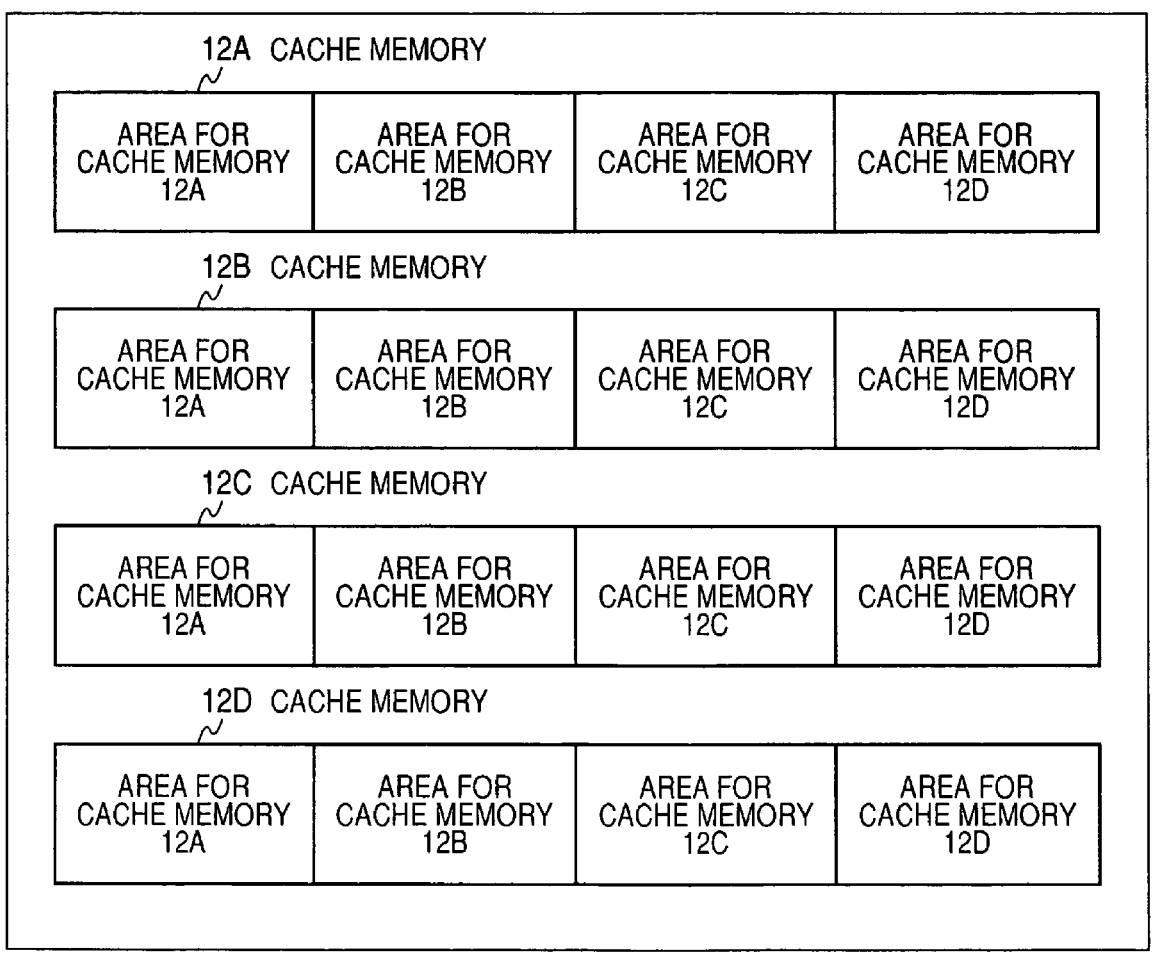
FIG. 15 is a conceptual diagram showing the allotment state of the storage areas of the cache memories.
Figure 16:
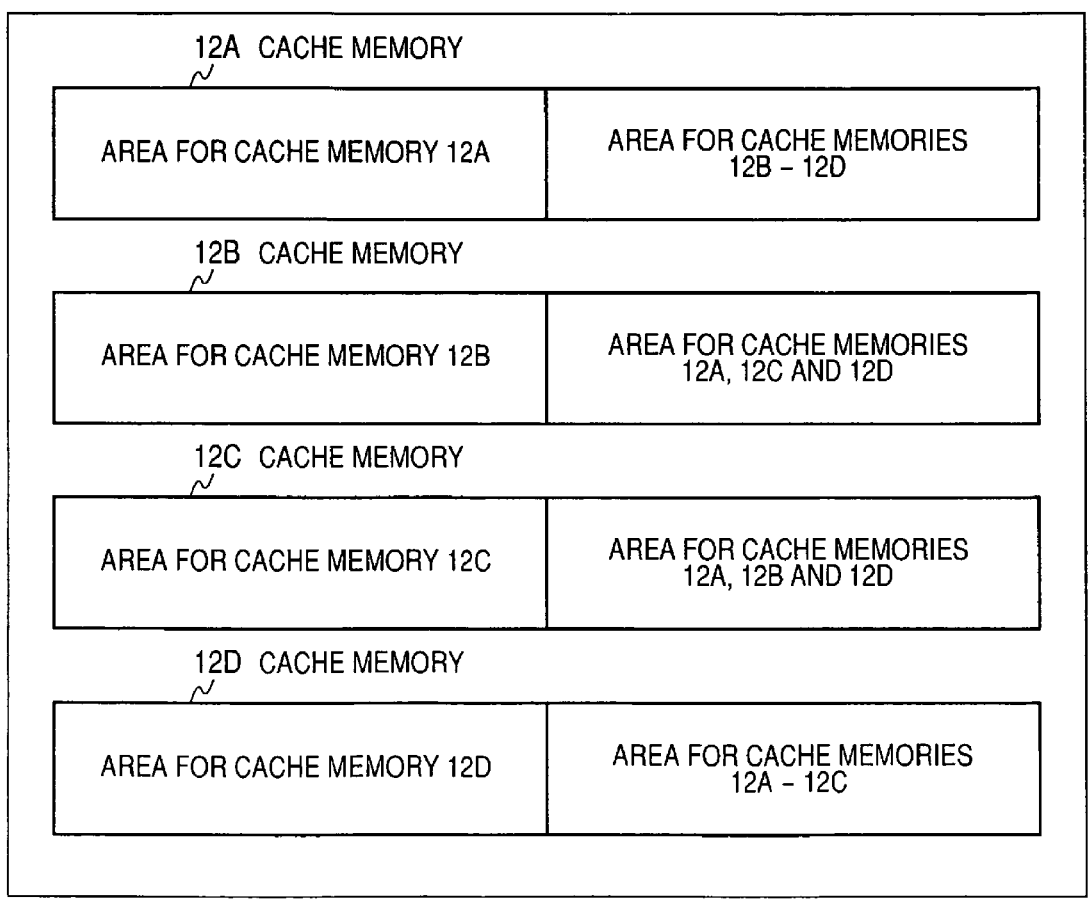
FIG. 16 is a conceptual diagram showing the allotment state of the storage areas of the cache memories.

Besides, in the foregoing embodiment, only the storage area for one cache memory 12 itself has been allotted to the pertinent cache memory, but the storage area for one cache memory 12 itself, and besides, a storage area for another cache memory may well be previously allotted to the pertinent cache memory. As shown in FIG. 15 by way of example, storage areas for all the cache memories 12A-12D may be equally allotted every cache memory 12. Also, as shown in FIG. 16 by way of example, an area of half of the whole storage area may be allotted as a storage area for each cache memory 12 itself, and an area of the remaining half may be allotted as a storage area for the other cache memories. Here, regarding the proportion of the storage areas, the highest performance can be ensured in the case where the storage areas for the cache memories are equally allotted, but the storage areas may well be allotted in any other proportion.

In this manner, the storage areas for all the cache memories are previously secured in each cache memory 12, whereby when the refresh or power supply of, for example, the cache memory 12A is to be stopped, the data of this cache memory 12A can be written into the storage area for the cache memory 12A as is previously allotted to, for example, the other cache memory 12B. Thus, dirty data can be written into the predetermined storage area of the cache memory without being written into the storage device 4, so that a processing speed can be enhanced, and the power saving control process can be executed within the controller 6.

Besides, in the foregoing embodiment, the volatile memory has been adopted as each cache memory, but a nonvolatile memory may well be adopted. In this case, the refresh becomes unnecessary, and hence, also the process concerning the refresh as stated above becomes unnecessary. On the other hand, in the case where the nonvolatile memory is adopted, data within the cache memory are retained even when the power supply of this cache memory is stopped. Therefore, when the power supply of the cache memory is to be stopped, the process for writing the dirty data of the cache memory into the storage device 4 can be omitted.

Further, in the foregoing embodiment, the DMA portions 111A-111D and the cache memories 12A-12D which correspond to one network port have been stopped, but objects to be stopped are not restricted thereto. By way of example, the DMA portions 111E-111I may well be stopped in accordance with the data rates of the individual network ports. Also, a logical volume corresponding to one network port may well be stopped. In this case, it becomes a requisite to design the storage control apparatus so that the logical volumes may be allotted to the respective network ports 18.

What is claimed is:

1. A storage control apparatus, comprising:
    a first communication control unit which includes a plurality of network ports, and which controls communications with a host computer that is connectable through the network ports;
    a second communication control unit which controls communications with a plurality of storage devices;
    a plurality of data transfer units which transfer data that are transmitted/received between the host computer and the storage devices, between said first communication control unit and said second communication control unit;
    a plurality of temporary storage units which temporarily store the data that are transferred by said data transfer units; and
    a power saving control unit which stops some of said data transfer units and said temporary storage units that are previously associated with the network ports, on the basis of connection situations of the respective network ports with the host computer,
    wherein said power saving control unit stops some of said data transfer units and said temporary storage units as are previously associated with the network ports, on the basis of the connection situations and data rates to be inputted/outputted to/from the respective network ports,
    wherein said power saving control unit includes:
    a network-port operation decision unit which receives a connection situation signal indicating the connection situation, from the network port, and which decides whether or not one network port corresponding to the connection situation signal is operating, on the basis of the received connection situation signal; and a data rate decision unit which operates in a case where it has been decided by said network-port operation decision unit that said one network port is operating, to decide whether or not a small data rate state where the data rate inputted/outputted to/from said one network port becomes, at most, a predetermined value has continued for, at least, a predetermined time period, and wherein in a case where it has been decided by said data rate decision unit that the small data rate state has continued for, at least, the predetermined time period, said data transfer unit and said temporary storage unit which are previously associated with said one network port are stopped.

2. A storage control apparatus as defined in claim 1, wherein:

the predetermined time period contains a first stop lower-limit time period, and a second stop lower-limit time period which is a time period longer than the first stop lower-limit time period; and said power saving control unit stops said data transfer unit corresponding to said one network port, in a case where it has been decided by said data rate decision unit that the small data rate state has continued for, at least, the first stop lower-limit time period; and said power saving control unit stops said temporary storage unit corresponding to said one network port, in addition to said data transfer unit corresponding to said one network port, in a case where it has been decided by said data rate decision unit that the small data rate state has continued for, at least, the second stop lower-limit time period.

3. A storage control apparatus as defined in claim 1, wherein:

the predetermined time period contains a first stop lower-limit time period, a second stop lower-limit time period which is a time period longer than the first stop lower-limit time period, and a third stop lower-limit time period which is a time period longer than the second stop lower-limit time period; and said power saving control unit stops said data transfer unit corresponding to said one network port, in a case where it has been decided by said data rate decision unit that the small data rate state has continued for, at least, the first stop lower-limit time period; said power saving control unit stops refresh of said temporary storage unit corresponding to said one network port, in addition to said data transfer unit corresponding to said one network port, in a case where it has been decided by said data rate decision unit that the small data rate state has continued for, at least, the second stop lower-limit time period; and said power saving control unit stops a power supply of said temporary storage unit corresponding to said one network port, in addition to said data transfer unit corresponding to said one network port, in a case where it has been decided by said data rate decision unit that the small data rate state has continued for, at least, the third stop lower-limit time period.

4. A storage control apparatus as defined in claim 1, wherein said power saving control unit further includes a second data rate decision unit which decides whether or not a data rate state where the data rate inputted/outputted to/from said one network port becomes, at most, a second predetermined value that is a value larger than the first-mentioned predetermined value has continued for, at least, a second predetermined time period; and in a case where it has been decided by said second data rate decision unit that the data rate state has continued for, at least, the second predetermined time period, surplus existence information which indicates that surplus exists in the data rate inputted/outputted to/from said one network port is stored in a memory, in association with information which identifies said one network port.

5. A storage control apparatus as defined in claim 4, wherein:

said power saving control unit further includes a surplus network-port decision unit which operates in stopping said data transfer unit and said temporary storage unit for said one network port, to decide whether or not any other network port corresponding to the stored surplus existence information is existent; and in a case where it has been decided by said surplus network-port decision unit that the other network port corresponding to the surplus existence information is existent, the data inputted/outputted to/from said one network port are transferred by said data transfer unit corresponding to the other network port and are stored in said temporary storage unit corresponding to the other network port.

6. A storage control apparatus as defined in claim 1, wherein in a case where the data rate inputted/outputted to/from said one network port has exceeded the first- mentioned predetermined value after the stops of said data transfer unit and said temporary storage unit which correspond to said one network port, said power saving control unit starts said data transfer unit and said temporary storage unit which correspond to said one network port.

7. A storage control apparatus as defined in claim 1, wherein:

in a case where it has been decided by said network-port operation decision unit that said one network port is not operating, said data transfer unit and said temporary storage unit which are previously associated with said one network port are stopped.

8. A storage control apparatus as defined in claim 7, wherein in a case where it has been decided by said network-port operation decision unit that said one network port is operating, after the stops of said data transfer unit and said temporary storage unit which correspond to said one network port, said power saving control unit starts said data transfer unit and said temporary storage unit which correspond to said one network port.

9. A storage control apparatus as defined in claim 1, wherein said power saving control unit is electrically connected with the network ports, said data transfer units and said temporary storage units, respectively.

10. A storage control apparatus as defined in claim 2, wherein said power saving control unit is electrically connected with the network ports, said data transfer units and said temporary storage units, respectively.

11. A storage control apparatus as defined in claim 3, wherein said power saving control unit is electrically connected with the network ports, said data transfer units and said temporary storage units, respectively.

12. A storage control apparatus as defined in claim 4, wherein said power saving control unit is electrically connected with the network ports, said data transfer units and said temporary storage units, respectively.

13. A storage control apparatus as defined in claim 5, wherein said power saving control unit is electrically connected with the network ports, said data transfer units and said temporary storage units, respectively.

14. A storage control apparatus as defined in claim 6, wherein said power saving control unit is electrically connected with the network ports, said data transfer units and said temporary storage units, respectively.

15. A storage control apparatus as defined in claim 7, wherein said power saving control unit is electrically connected with the network ports, said data transfer units and said temporary storage units, respectively.

16. A storage control apparatus as defined in claim 8, wherein said power saving control unit is electrically connected with the network ports, said data transfer units and said temporary storage units, respectively.

* * * * *